(12) United States Patent
McCarthy, Jr. et al.

(10) Patent No.: US 10,337,419 B2
(45) Date of Patent: Jul. 2, 2019

(54) METHOD AND SYSTEM FOR DIESEL CYLINDER DEACTIVATION

(71) Applicant: Eaton Corporation, Cleveland, OH (US)

(72) Inventors: James Edward McCarthy, Jr., Kalamazoo, MI (US); Douglas John Nielsen, Marshall, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/323,415

(22) PCT Filed: Jan. 19, 2016

(86) PCT No.: PCT/US2016/013863
§ 371 (c)(1),
(2) Date: Dec. 31, 2016

(87) PCT Pub. No.: WO2016/118482
PCT Pub. Date: Jul. 28, 2016

(65) Prior Publication Data
US 2017/0159581 A1    Jun. 8, 2017

Related U.S. Application Data

(60) Provisional application No. 62/104,989, filed on Jan. 19, 2015.

(51) Int. Cl.
*F02B 3/06* (2006.01)
*F02B 37/00* (2006.01)
(Continued)

(52) U.S. Cl.
CPC ............... *F02D 17/02* (2013.01); *F02B 3/06* (2013.01); *F02B 33/00* (2013.01); *F02B 37/00* (2013.01);
(Continued)

(58) Field of Classification Search
CPC ...... F02D 17/00–026; F02D 2041/0012; F02D 41/0087
See application file for complete search history.

(56) References Cited

U.S. PATENT DOCUMENTS 5,345,918 A * 9/1994 Lambert ................. F02B 75/16
123/527
5,813,383 A 9/1998 Cummings
(Continued)

FOREIGN PATENT DOCUMENTS

| GB | 2504953 A | 2/2014 |
|----|-----------|--------|
| JP | 2009191727 A | 8/2009 |
| JP | 2011007051 A | 1/2011 |

OTHER PUBLICATIONS

International Search Report and Written Opinion of the International Searching Authority dated May 4, 2016 in PCT/US2016/013863, pp. 1-22.
(Continued)

*Primary Examiner* — Laert Dounis
(74) *Attorney, Agent, or Firm* — Mei & Mark, LLP

(57) ABSTRACT

A system and method for cylinder deactivation in a multi-cylinder diesel engine comprises pumping air in to an intake manifold of the diesel engine using a turbocharger. Air is pumped in to the intake manifold using an intake air assisting device. And, fuel injection is selectively deactivated to at least one of the cylinders in the diesel engine. An intake valve and an exhaust valve is selectively deactivated for the at least one of the cylinders of the diesel engine.

62 Claims, 20 Drawing Sheets

(51) Int. Cl.
| | | |
|---|---|---|
| F02B 37/04 | (2006.01) | |
| F02D 17/02 | (2006.01) | |
| F02D 13/02 | (2006.01) | |
| F02D 41/00 | (2006.01) | |
| F02D 41/02 | (2006.01) | |
| F02B 33/00 | (2006.01) | |
| F02D 41/14 | (2006.01) | |
| F02D 13/06 | (2006.01) | |
| F02M 26/03 | (2016.01) | |
| F02B 37/14 | (2006.01) | |
| F02M 26/02 | (2016.01) | |
| F02M 26/08 | (2016.01) | |
| F02D 23/02 | (2006.01) | |

(52) U.S. Cl.
CPC .............. *F02B 37/04* (2013.01); *F02B 37/14* (2013.01); *F02D 13/0215* (2013.01); *F02D 13/0265* (2013.01); *F02D 13/06* (2013.01); *F02D 23/02* (2013.01); *F02D 41/0007* (2013.01); *F02D 41/0052* (2013.01); *F02D 41/0087* (2013.01); *F02D 41/024* (2013.01); *F02D 41/0275* (2013.01); *F02D 41/146* (2013.01); *F02D 41/1446* (2013.01); *F02M 26/02* (2016.02); *F02M 26/03* (2016.02); *F02M 26/08* (2016.02); *F02D 13/0211* (2013.01); *F02D 41/005* (2013.01); *F02D 41/1445* (2013.01); *F02D 2013/0292* (2013.01); *F02D 2041/0012* (2013.01); *F02D 2200/101* (2013.01); *Y02T 10/144* (2013.01); *Y02T 10/18* (2013.01)

(56) References Cited

U.S. PATENT DOCUMENTS

| | | | | |
|---|---|---|---|---|
| 6,098,592 | A | * | 8/2000 | Hess ..................... F02D 11/105 123/198 F |
| 6,786,191 | B2 | | 9/2004 | Foster |
| 6,874,463 | B1 | | 4/2005 | Bolander et al. |
| 6,904,752 | B2 | | 6/2005 | Foster et al. |
| 6,931,839 | B2 | | 8/2005 | Foster |
| 7,222,614 | B2 | | 5/2007 | Bryant |
| 7,240,480 | B1 | * | 7/2007 | Brevick ................ F01N 3/0842 123/295 |
| 7,260,467 | B2 | | 8/2007 | Megli et al. |
| 7,360,356 | B2 | | 4/2008 | Narita et al. |
| 8,006,670 | B2 | | 8/2011 | Rollinger et al. |
| 8,131,445 | B2 | | 3/2012 | Tripathi et al. |
| 8,327,619 | B2 | | 12/2012 | Persson |
| 8,573,171 | B2 | | 11/2013 | Cecur et al. |
| 8,667,953 | B2 | | 3/2014 | Gallon et al. |
| 8,849,550 | B2 | | 9/2014 | Larsson et al. |
| 8,910,614 | B2 | | 12/2014 | Bevan et al. |
| 9,175,613 | B2 | | 11/2015 | Parsels et al. |
| 9,181,820 | B2 | | 11/2015 | Tani et al. |
| 9,267,454 | B2 | | 2/2016 | Wilcutts et al. |
| 2003/0101961 | A1 | | 6/2003 | Foster |
| 2003/0121249 | A1 | * | 7/2003 | Foster ................ B60H 1/00314 60/285 |
| 2003/0131820 | A1 | * | 7/2003 | Mckay ................ F01L 13/0005 123/198 F |
| 2003/0183185 | A1 | * | 10/2003 | Sun ......................... F01L 9/02 123/179.16 |
| 2004/0098970 | A1 | * | 5/2004 | Foster ..................... F01N 3/023 60/284 |
| 2004/0144360 | A1 | * | 7/2004 | Surnilla ................ F01N 3/0842 123/339.11 |
| 2004/0216449 | A1 | * | 11/2004 | Szymkowicz ........ F01N 3/2006 60/284 |
| 2004/0255576 | A1 | * | 12/2004 | Brown .................... F02D 17/02 60/285 |
| 2005/0204727 | A1 | | 9/2005 | Lewis et al. |
| 2006/0218899 | A1 | * | 10/2006 | Narita ................... F01N 3/0821 60/285 |
| 2007/0074513 | A1 | * | 4/2007 | Lamb .................... F01N 13/107 60/612 |
| 2007/0272202 | A1 | * | 11/2007 | Kuo .................... F02D 13/0211 123/295 |
| 2010/0205943 | A1 | * | 8/2010 | Gonze ................... F01N 3/0256 60/286 |
| 2011/0083639 | A1 | | 4/2011 | Gallon et al. |
| 2012/0221217 | A1 | * | 8/2012 | Sujan ..................... B60W 10/06 701/54 |
| 2014/0041626 | A1 | | 2/2014 | Wilcutts et al. |
| 2014/0116363 | A1 | | 5/2014 | Stretch et al. |
| 2014/0360179 | A1 | * | 12/2014 | Doering ................ F02B 37/183 60/602 |

OTHER PUBLICATIONS

Roberts, Leighton et al., "Impact of Cylinder Deactivation at Idle on Thermal Management and Efficiency," SAE Commercial Vehicle Conference, Oct. 7-9, 2014 in Chicago, SAE International 14CV-0336, pp. 1-20.

Roberts, Leighton et al., "Impact of Early Exhaust Valve Opening on Exhaust Aftertreatment Thermal Management and Efficiency for Compression Ignition Engines," SAE Commercial Vehicle Conference, Oct. 7-9, 2014 in Chicago, SAE International 14CV-0335, pp. 1-19.

Roberts, Charles E., "Variable Valve Timing," SwRI Project No. 03.03271, San Antonio, Mar. 2004; pp. 1-107.

Pfahl, Ulrich, "Tier 4 Off-Highway Emission Challenges," AVL Tech Cafe, SAE, Apr. 18, 2007; pp. 1-35.

Magee, Mark E., "Exhaust Thermal Management Using Cylinder Deactivation," Thesis, Purdue University, West Lafayette, Dec. 2013, pp. 1-62.

Garg, Akash, "Exhaust Thermal Management Using Intake Valve Closing Timing Modulation," Thesis, Purdue University, dated Dec. 2013, published ProQuest LLC 2014, UMNI No. 1553531, pp. 1-108.

Roberts, Leighton E., "Analysis of the Impact of Early Exhaust Valve Opening and Cylinder Deactivation on Aftertreatment Thermal Management and Efficiency for Compression Ignition Engines," Thesis, Purdue University, West Lafayette, dated Dec. 2014, pp. 1-99.

\* cited by examiner

| NOx CONVERSION EFFICIENCY | CATALYST TEMPERATURE REFERENCE | ENG. OUT NOx TO MEET TAILPIPE (0.2 g/hp-hr) | ENG. OUT NOx TO MEET TAILPIPE (0.3 g/hp-hr) |
|---|---|---|---|
| 0% | 100C | 0.20 | 0.3 |
| 24% | 150C | 0.26 | 0.39 |
| 78% | 200C | 0.91 | 1.36 |
| 90% | 250C | 2.0 | 3.0 |
| 96% | 300C | 5.0 | 7.5 |

FIG. 13

METHOD AND SYSTEM FOR DIESEL CYLINDER DEACTIVATION

FIELD

This application relates to diesel engine fuel management techniques. and provides a method and system for extending cylinder deactivation to mid-range engine loads.

BACKGROUND

It is possible to control combustion processes in diesel engines to limit the number of cylinders providing torque output. One technique is cylinder cut-out. The technique eliminates fuel to a cylinder while continuing to cycle the intake and exhaust valves. The piston also cycles. The technique results in fuel economy losses.

At very low loads and idle conditions, an engine runs with poor fuel efficiency. All cylinders are firing, but little to no torque output is needed. Even in a loaded idle condition, the engine could provide more torque than necessary. Fuel is wasted, and the fuel economy is poor.

The low, and inefficient, fuel use is not effective to heat the aftertreatment system, and so pollution is high.

It would be beneficial to improve fuel economy and fuel efficiency in a diesel engine. It is beneficial to reduce pollution.

SUMMARY

The disclosure overcomes the above disadvantages and improves the art by way of a system and method for cylinder deactivation in a multi-cylinder diesel engine, comprising pumping air in to an intake manifold of the diesel engine using a turbocharger. Air is pumped in to the intake manifold using an intake air assisting device. And, fuel injection is selectively deactivated to at least one of the cylinders in the diesel engine. An intake valve and an exhaust valve is selectively deactivated for the at least one of the cylinders of the diesel engine.

A multiple cylinder diesel engine system comprises a multiple cylinder diesel engine comprising a respective intake valve and a respective exhaust valve for each of the multiple cylinders. An intake manifold is connected to supply air to the multiple cylinders of the diesel engine. An exhaust manifold is connected to receive exhaust from the multiple cylinders of the diesel engine. An intake air assisting device is connected to pump air in to the intake manifold. A valve control system is connected to selectively deactivate a respective intake valve and a respective exhaust valve for a cylinder of the multiple cylinder diesel engine. A fuel injection control system is connected to selectively deactivate fuel injection to the cylinder. The multiple cylinder diesel engine enters a cylinder deactivation mode whereby the valve control system deactivates the respective intake valve and the respective exhaust valve for the cylinder. The valve control system deactivates fuel injection to the cylinder while other cylinders of the multiple cylinder diesel engine continue to fire.

A pollution management system for a diesel engine, comprises a diesel engine comprising a plurality of combustion cylinders. Each of the plurality of combustion cylinders comprises a respective piston connected to a crankshaft, a fuel injector connected to an injection controller, an intake valve connected to an intake valve controller, and an exhaust valve connected to an exhaust valve controller. An exhaust system is connected to the exhaust valves. The exhaust system comprises a catalyst for filtering pollution from an exhaust stream and a sensor for measuring a pollution level in the exhaust stream. A control unit comprises a processor, a memory device, and processor-executable control algorithms stored in the memory. The control algorithms are configured to receive pollution level sensor data from the sensor, determine a pollution level in the exhaust stream, and determine whether the pollution level exceeds a pollution threshold. When the pollution level in the exhaust stream exceeds a pollution threshold, the control system selects at least one of the plurality of combustion cylinders for deactivation, commands the injection controller to deactivate the respective fuel injector for the at least one of the selected combustion cylinders, commands the intake valve controller to deactivate the respective intake valve for the at least one of the selected combustion cylinders, and commands the exhaust valve controller to deactivate the respective exhaust valve controller for the at least one of the selected combustion cylinders.

A method for operating a multiple cylinder diesel engine system in a cylinder deactivation mode comprises determining that the diesel engine system is operating within at least one threshold range. Cylinder deactivation mode is entered in at least one cylinder of a multiple-cylinder diesel engine when the diesel engine system is operating within the at least one threshold range. An air fuel ratio is adjusted to at least one firing cylinder of the multiple-cylinder diesel engine based on the entering of cylinder deactivation mode in the at least one cylinder. Entering cylinder deactivation mode comprises deactivating fuel injection to the at least one cylinder and deactivating intake valve actuation and exhaust valve actuation to the at least one cylinder.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

BRIEF DESCRIPTION OF THE DRAWINGS

FIG. 13 is a chart contrasting NOx conversion efficiency to catalyst temperature, engine-out NOx, and tailpipe emission requirements.

DETAILED DESCRIPTION

Figure 1A:
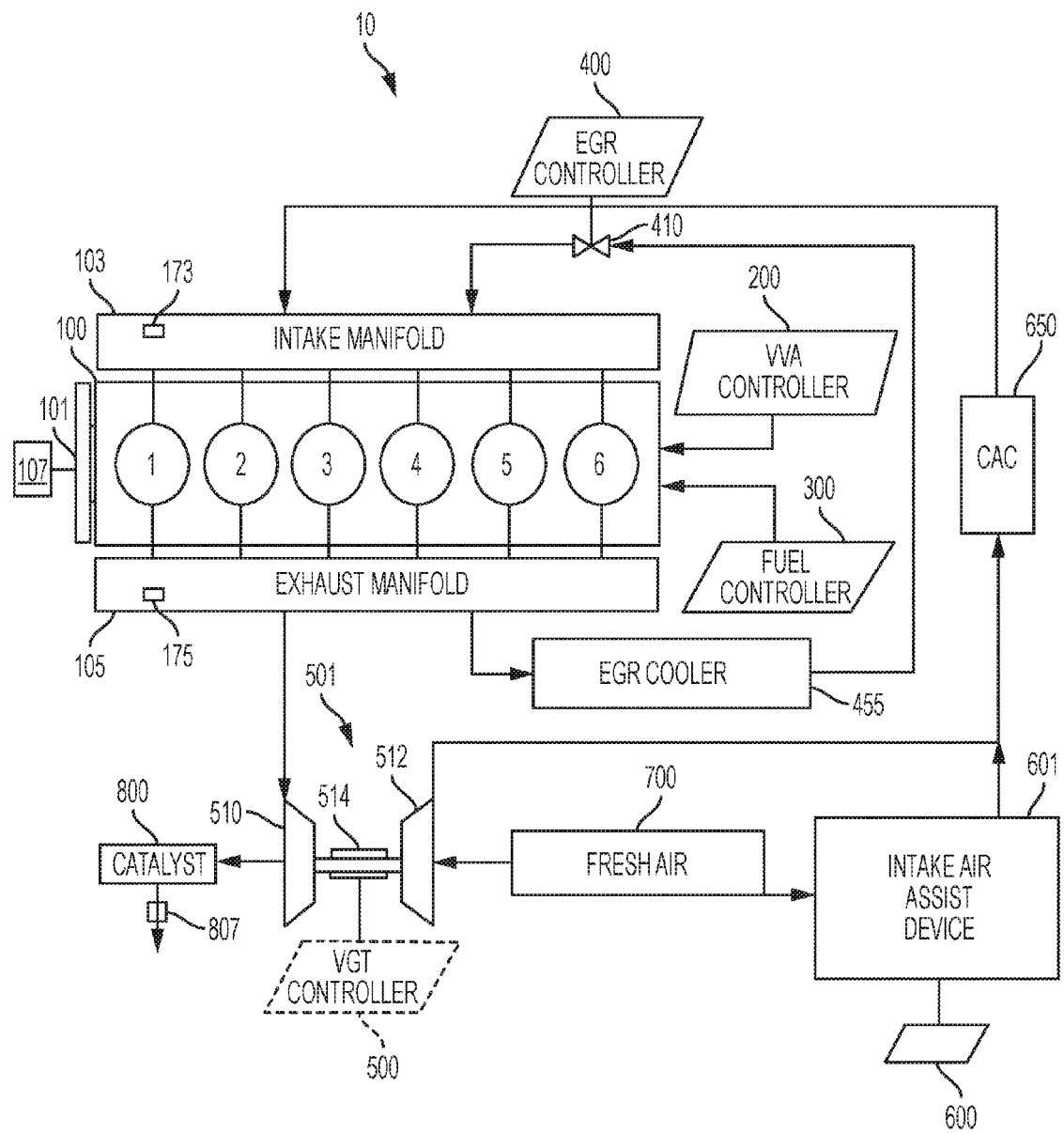
FIGS. 1A & 1B are schematics for an engine system.

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

Cylinder deactivation (CDA), where the intake valve, exhaust valve, and fuel injection are shut off for a selected cylinder cycle, is not obvious for diesel engines for several reasons. Many benefits inure and can be used to improve fuel economy and pollution control. Contrary to prior research, CDA can be used to benefit fuel economy and pollution control in heavy machinery and light auto. For example, low load cylinders can be deactivated to yield a fuel economy increase. The efficiency of the engine increases because of a reduction in friction via elimination of valve motion. Further, turning off in-efficient cylinders to increase the efficiency of other cylinders improves fuel economy over-all.

Cylinder deactivation differs from "cylinder cut-out," which merely turns off fuel injection to a chosen cylinders, but leaves affiliated valves in motion. Cylinder cut-out results in measurable and detrimental system losses. Cylinder deactivation, however, achieves measurable system gains. As cylinders are deactivated, other firing cylinders must increase their torque output (load) to maintain the user experience. Increasing the load on the firing cylinders increases their fuel efficiency & brake thermal efficiency. Deactivating the intake and exhaust valves on the deactivated cylinders reduces energy losses to move those valves, which increases fuel economy.

CDA can be used during certain duty cycles. For example, when on the highway, heavy duty trucks can turn off CDA for high speed or cruising duty cycles. But, for example, a garbage truck can use CDA throughout the pickup duty cycle. The same can be applied to a bus for a transport versus a pick-up duty cycle.

Normal operation of a 3, 4, 5, 6, 8, or 10 cylinder diesel engine involves inducing air into the intake manifold, closing valves on the cylinders, injecting fuel, igniting the fuel for combustion, and emptying the cylinder for the next cycle.

When the operating conditions do not require full torque output, it is possible to limit which cylinders receive fuel, and it is further possible to tailor the amount of fuel injected in to the individual cylinders. For example, it is possible to run the engine at 50% load capacity by deactivating fuel injection to half of the cylinders while using the remaining cylinders at full torque capacity. An even number of cylinders can be deactivated to balance torsion across the engine, but it is also possible to deactivate a single cylinder, or another odd number of cylinders, to receive fuel efficiency benefits. The fuel efficiency of the fully used cylinders is extremely high, while there is no fuel use in the deactivated cylinders. The overall fuel efficiency for the motive device is improved, and fuel consumption is reduced. The strategy permits tailoring the torque output to the driving conditions. Using a six cylinder engine as an example, it is possible to deactivate 2 or 4 cylinders while fully or partially using the torque output capacity of the remaining cylinders.

Turning to FIG. 1A, a schematic for an engine system is shown. An engine 100 comprises 6 cylinders 1-6. Other numbers of cylinders can be used, but for discussion, 6 cylinders are illustrated. The cylinders 1-6 receive intake fluid, which is combustion gas, such as air, or air mixed with exhaust (exhaust gas recirculation "EGR"), from the intake manifold 103. An intake manifold sensor 173 can monitor the pressure, flow rate, oxygen content, exhaust content or other qualities of the intake fluid. The intake manifold 103 connects to intake ports 133 in the engine block to provide intake fluid to the cylinders 1-6. In a diesel engine, the intake manifold has a vacuum except when the intake manifold is boosted. CDA is beneficial, because the cylinder can be closed. Instead of pulling the piston down against a vacuum situation, the deactivated cylinder has a volume of fluid that is not at a vacuum. Fuel efficiency is gained by not drawing the piston down against a vacuum.

Fuel is injected to individual cylinders via a fuel injection controller 300. The fuel injection controller 300 can adjust the amount and timing of fuel injected in to each cylinder and can shut off and resume fuel injection to each cylinder. The fuel injection for each cylinder 1-6 can be the same or unique for each cylinder 106, such that one cylinder can have more fuel than another, and one cylinder can have no fuel injection, while others have fuel.

Figure 3B:
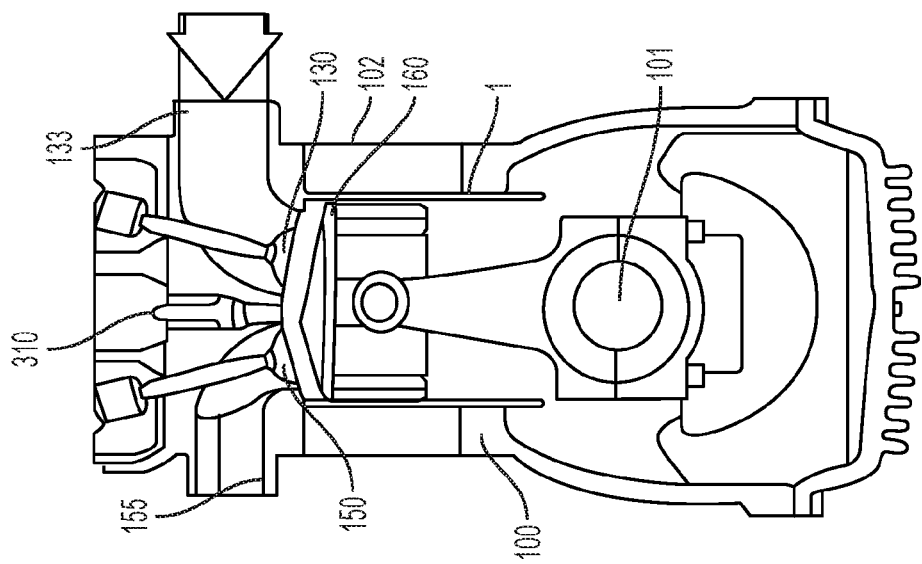
FIGS. 3A-3C are alternate views of an example engine.
Figure 3A:
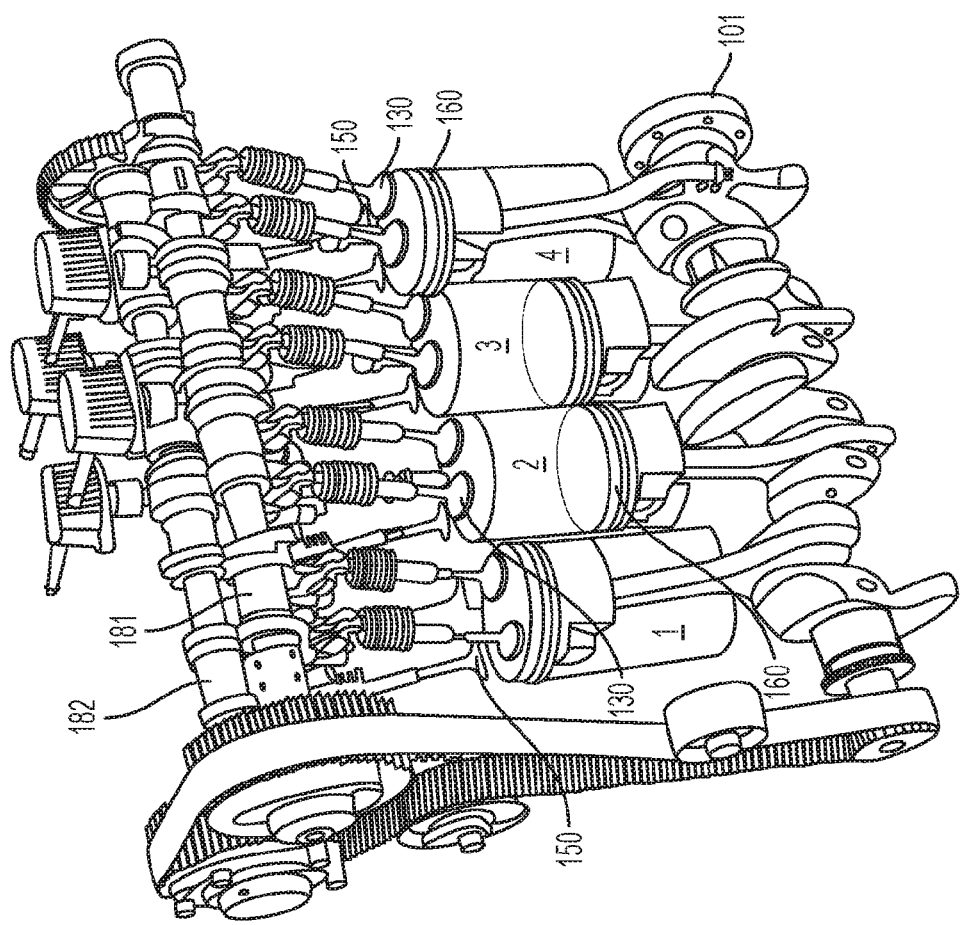
Figure 3C:
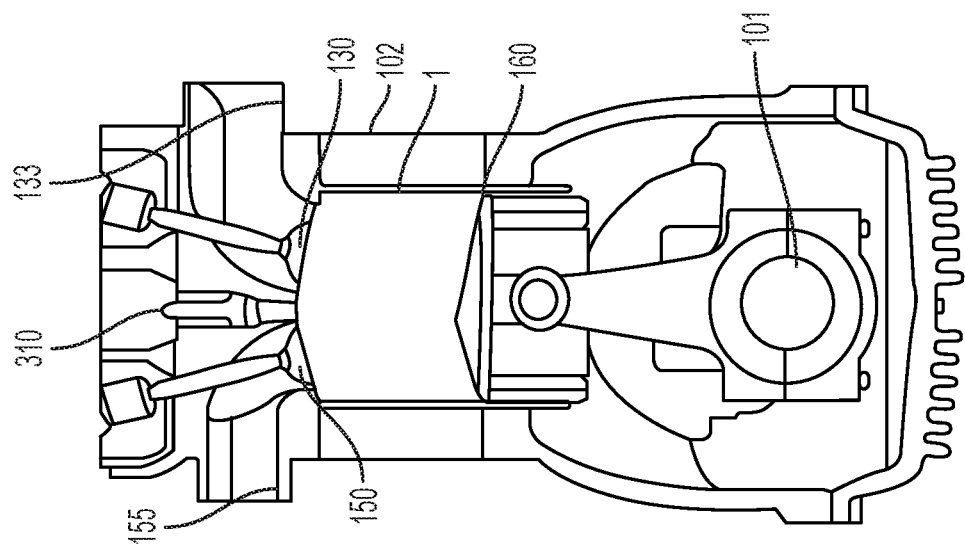

A variable valve actuator (VVA) 200 also couples to the cylinders 1-6 to actuate intake valves 130 and exhaust valves 150. The VVA 200 can change the actuation of the intake valves 130 and exhaust valves 150 so as to open or close the valves normally, early, or late, or combinations thereof, or cease operation of the valves. Early Intake Valve Opening (EIVO), Early Intake Valve Closing (EIVC), Late Intake Valve Opening (LIVO), Late Intake Valve Closing (LIVC), Early Exhaust Valve Opening (EEVO), Early Exhaust Valve Closing (EEVC), Late Exhaust Valve Opening (LEVO), Late Exhaust Valve Closing (LEVC), a combination of EEVC and LIVO or Negative Valve Overlap (NVO) can be implemented by the VVA 200. VVA 200 can cooperate with a hydraulic, electric, or electric solenoid system to control the intake and exhaust valves 130, 150. The engine 100 can be cam or camless, or a hybrid "cam-camless VVA." So, the intake and exhaust valves 130, 150 can either couple to a cam system for actuation, as the camshafts 801, 802 example of FIG. 3A, a hydraulic rail, a latched rocker arm, other rocker arm, an electro hydraulic actuator, etc. Or a cam less direct acting mechanism can selectively operate the individual valves. While FIGS. 3B &3C show one intake valve 130 and one exhaust valve 150, it is possible to have two intake valves 130 and two exhaust valves 150 per each cylinder, as in FIG. 3A. The engine block 102 is removed for the example of FIG. 3A for clarity, and the cylinders are shown in broken lines.

A diesel engine works by compressing intake fluid in a cylinder 1-6 using a piston 160. Fuel is injected via fuel injector 310. The high heat and compression ignites the fuel, and combustion forces the piston from top dead center (TDC) to bottom dead center (BDC) and torque is thereby directed to the crankshaft 101. Diesel operation can be referred to as "4 stroke," though other operation modes such as 2-stroke and 8-stroke are possible. In 4-stroke, the piston moves from TDC to BDC to fill the cylinder with intake fluid (stroke 1). The start of the cycle is shown in FIG. 3B, and FIG. 3C shows the end of stroke 1, when the cylinder is full of intake fluid. The piston rises back to TDC (stroke 2). Fuel is injected and ignites to push the piston 160 to BDC (stroke 3). The piston rises again to TDC to expel the exhaust out the exhaust valve (stroke 4). The intake valve 130 is open during stroke 1 and closed during strokes 2-4, though the VVA 200 can adjust the timing of opening and closing. The exhaust valve 150 is open during stroke 4 and closed during strokes 2-4, though the VVA 200 can adjust the timing of opening and closing.

Exhaust gases leave cylinders through exhaust ports 155 in engine block 102. Exhaust ports 155 communicate with an exhaust manifold 105. An exhaust manifold sensor 175 can monitor the pressure, flow rate, oxygen content, nitrous or nitric oxide (NOx) content, sulphur content, other pollution content or other qualities of the exhaust gas. Exhaust gas can power a turbine 510 of a variable geometry turbocharger (VGT) 501 or other turbocharger. The turbocharger 501 can be controlled via a turbocharger controller 500 to adjust a coupling 514 between the turbine 510 and the compressor 512. The VGT can be adjust so as to control intake or exhaust flow rate or back pressure in the exhaust.

Exhaust gas is filtered in an aftertreatment system. The aftertreatment system can include a variety of pollution management mechanisms such as a hydrocarbon, fuel or urea doser. Several filters can be alone or in combination, such as DOC, DPF, SCR, NH3, Cu-Ze SCR, among others. One or more catalyst 800 filters pollution, and can comprise a diesel particulate filter (DPF), Diesel catalysts typically comprise a variety of rare earth metals to filter pollution, including NOx. At least one exhaust sensor 807 is placed in the aftertreatment system to measure exhaust conditions such as tailpipe emissions, NOx content, exhaust temperature, flow rate, etc. The exhaust sensor 807 can comprise more than one type of sensor, such as chemical, thermal, optical, resistive, velocity, pressure, etc. The exhaust sensor 807 can comprise an array of sensors, with sensor distribution options including before, after, or within the catalyst 800. A sensor linked with the turbocharger 501 can also be included to detect turbine and compressor activity.

Exhaust can exit the system after being filtered by the at least one catalyst 800. Or, exhaust can be redirected to the intake manifold 103 via a variety of pathways, some of which are illustrated in FIGS. 1A-2. In FIG. 1A, exhaust is cooled in an EGR cooler 455. An EGR controller 400 actuates an EGR valve 410 to selectively control the amount of EGR supplied to the intake manifold 103. The exhaust recirculated to the manifold 103 impacts the air fuel ration (AFR) in the cylinder. Exhaust dilutes the oxygen content in the manifold 103. Unburned fuel from the fuel doser, or unburned fuel remaining after combustion increases the fuel amount in the AFR. Soot and other particulates and pollution gases also reduce the air portion of the air fuel ratio. While fresh air brought in through the intake system 700 can raise the AFR, EGR can lower AFR, and fuel injection to the cylinders can lower the AFR further. Thus, the EGR controller, fuel injection controller 400 and intake assist controller 600 can tailor the air fuel ratio to the engine operating conditions by respectively operating EGR valve 410, fuel injector 310, and intake assist device 610. So, adjusting the air fuel ratio to a firing cylinder can comprise one of boosting fresh air to the at least one firing cylinder by controlling a supercharger, or decreasing air fuel ratio to a firing cylinder by boosting exhaust gas recirculation to the firing cylinder. This can be done with or without augmenting a turbocharger 501.

Figure 1B:
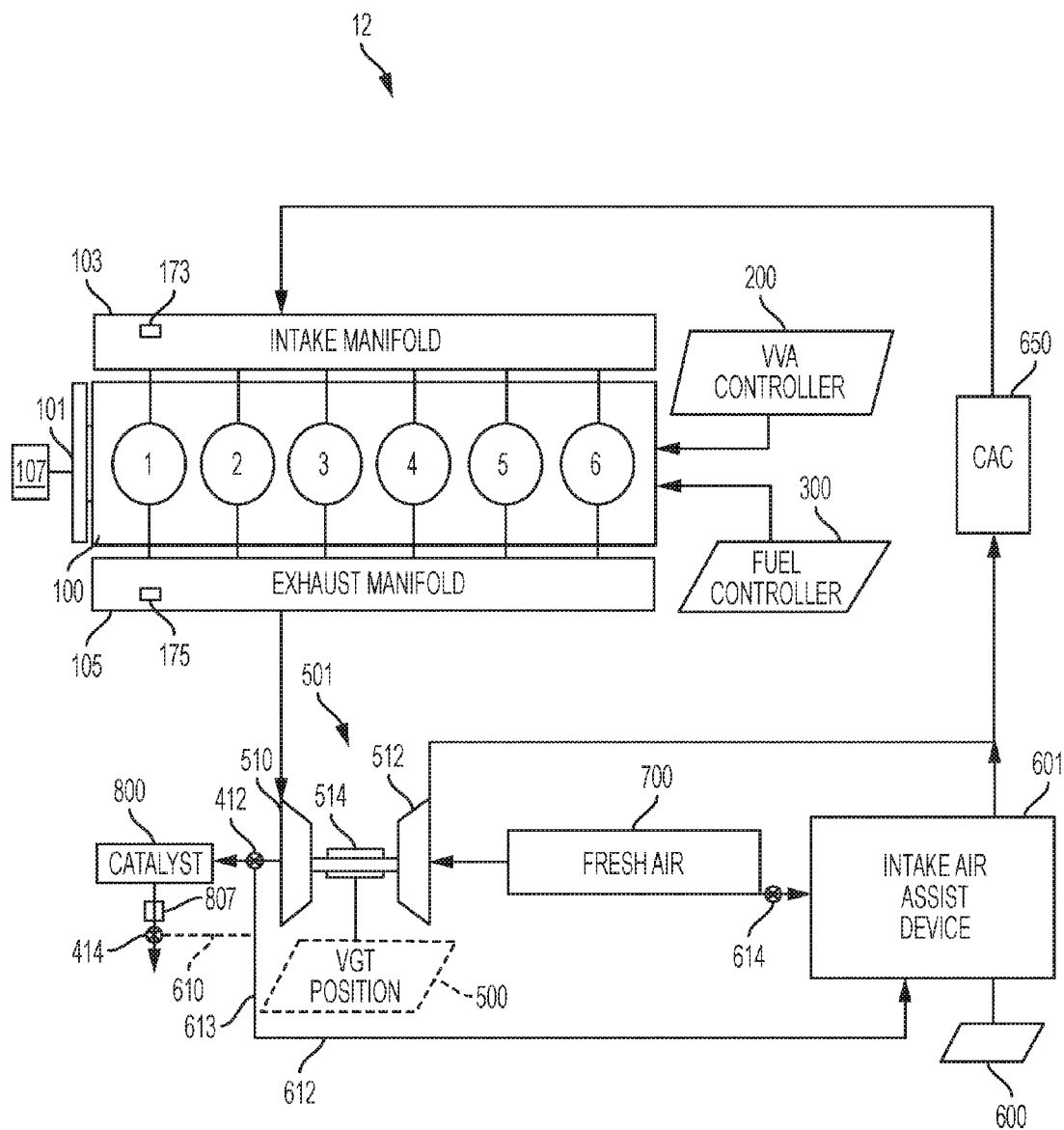
Figure 2:
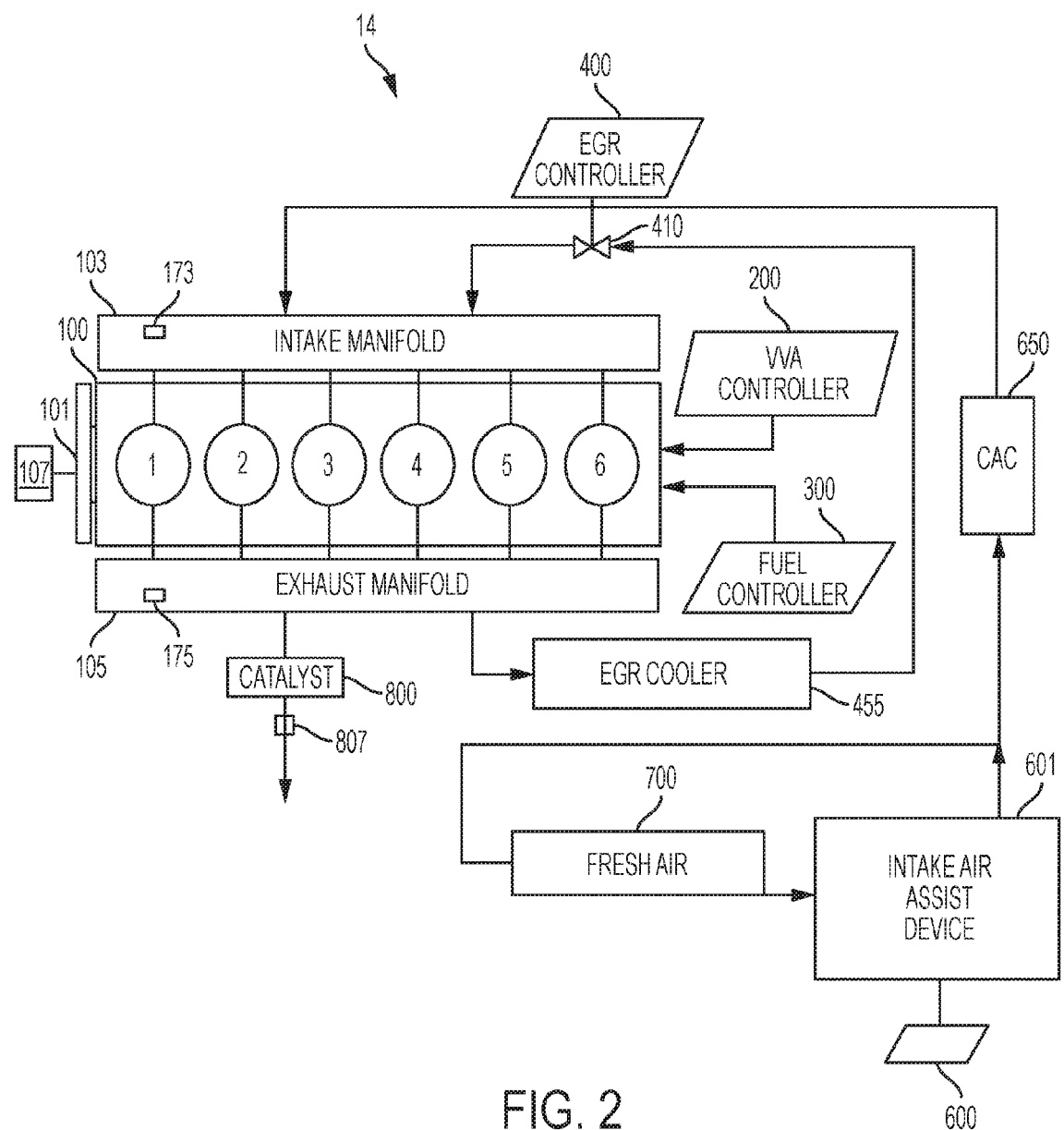
FIG. 2 is a schematic for another engine system.

Variant engine system 12 in FIG. 1B removes one exhaust gas recirculation path in favor of alternate pathways. EGR controller 400 can couple instead to EGR valve 412 to direct exhaust gas along second EGR path 613, along EGR path 612 to intake air assisting device 601. Alternatively, exhaust gas can be recirculated after being filtered by catalyst 800. So EGR valve 414 can be controlled by EGR controller 400 to direct some portion of EGR along first EGR path 610, along EGR path 612, to intake assisting device 601. Controlling EGR valve 412 or EGR valve 414 tailors the amount of exhaust included in the air fuel ratio within cylinders 1-6.

Figure 16A:
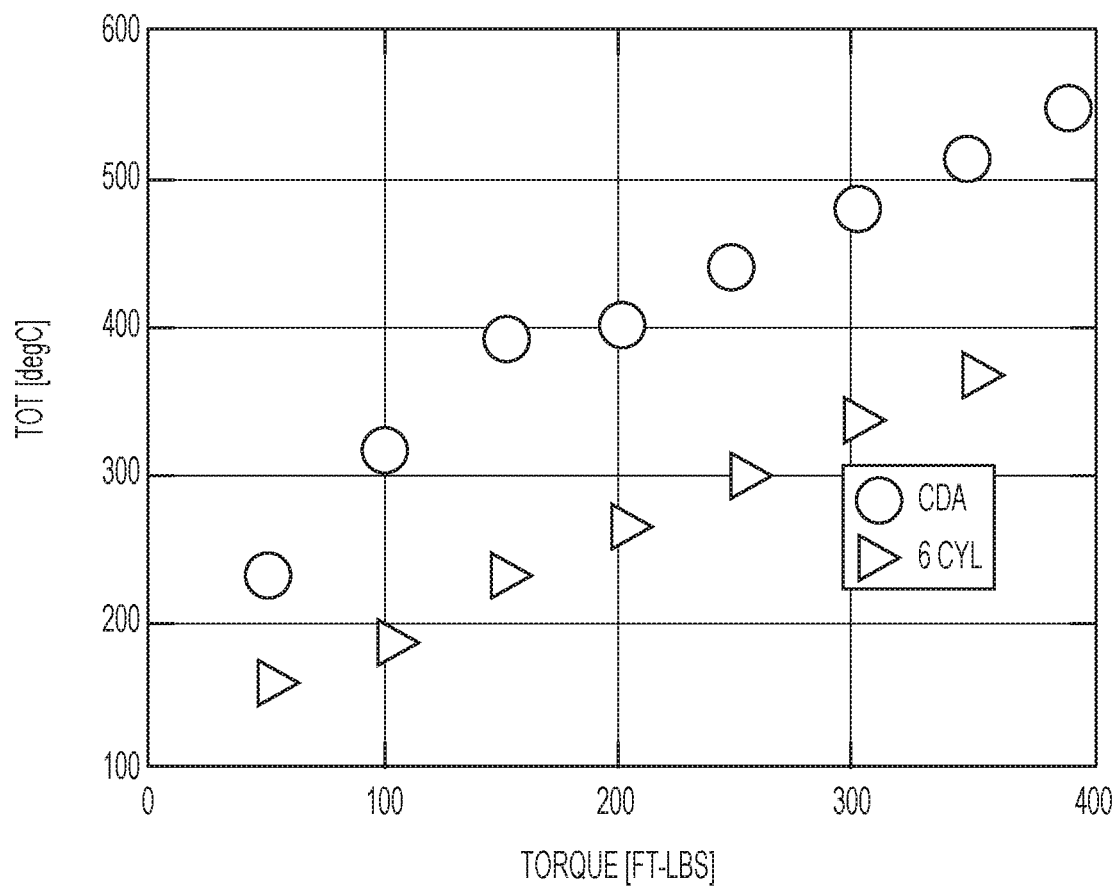
FIGS. 16A-16D contrast 3-cylinder CDA mode against 6-cylinder mode for various outputs of an example engine.
Figure 16B:
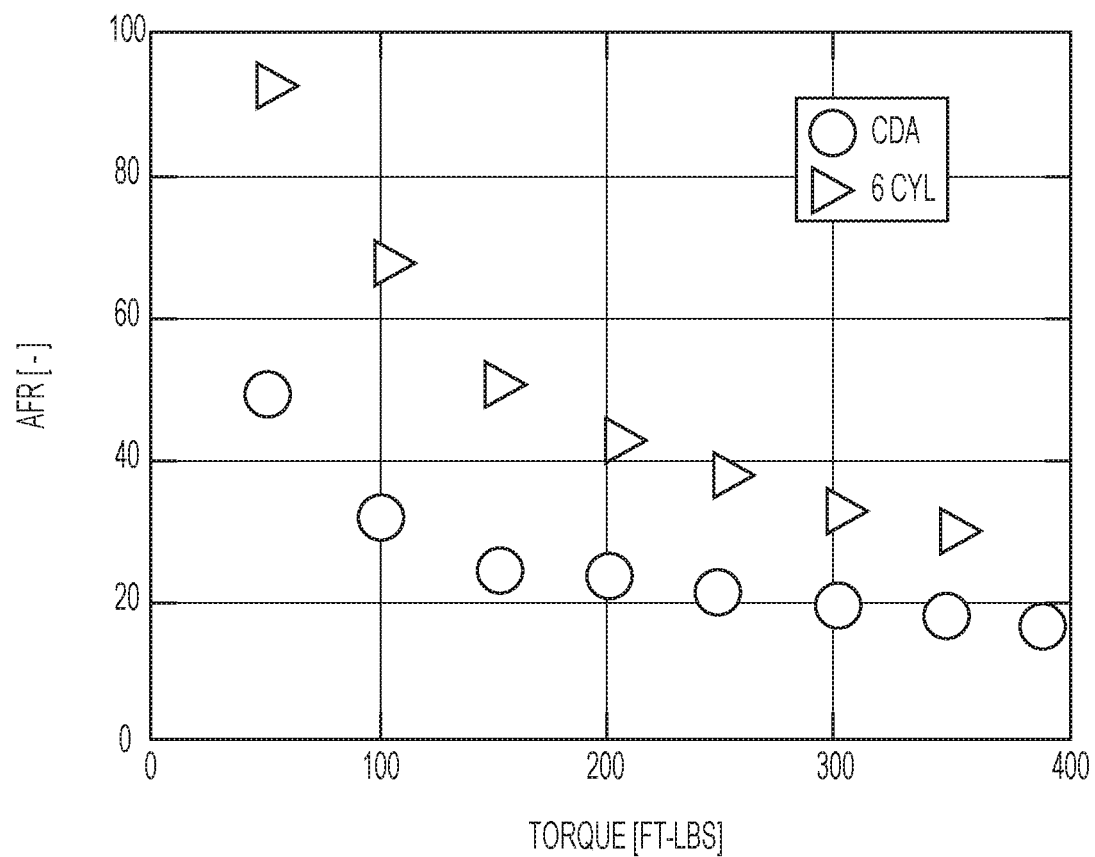

FIG. 16B compares the air fuel ratio (AFR) to the load (torque in foot-pounds) for an example 6-cylinder engine in normal mode (triangles) versus CDA mode (circles). Deactivating half of the cylinders cuts the AFR. At some point, the AFR becomes too low, and a soot problem arises.

Using a very small intake assist device 601 extends the operating range of cylinder deactivation (CDA) by boosting the available oxygen. A small air pump, supercharger, or fan is connected to an oxygenating source, such as intake system 700, The intake system can supply fresh air to increase the air fuel ratio in the intake manifold of the diesel engine. Instead of limiting CDA to low load or idle conditions, the intake assist device 601 can increase air flow to the intake manifold and can increase the air to the cylinders. This can provide a more lean burn engine by raising the air portion of the AFR. While it is possible to lower the AFR during cylinder deactivation (CDA) mode, the intake assist device makes it possible to increase the AFR by adding flow against a low pressure intake manifold. This is contrary to the prior art, which seeks to eliminate energy drains during CDA mode. EGR does not need to be suspended to limit CO2 contributions, but it can be regulated.

By controlling the air fuel ratio to the cylinders 1-6, it is possible to eliminate the turbocharger 501, thus simplifying the control algorithm outputs and reducing system outlay. In FIG. 2, the turbocharger 501 is eliminated. Fresh air can be naturally aspirated through the intake system 700 to the intake manifold 103, and the intake assist device 601 can be selectively controlled to boost the intake flow to the intake manifold 103. Should the intake assist device heat the intake flow, such as when using a supercharger, a charge air cooler 650 can optionally be included to regulate intake flow temperature. As discussed in more detail below, the use of cylinder deactivation in low load and idle modes, and boosting intake via the intake assist device 601 in medium load modes eliminates the diesel engine system reliance on a turbocharger for air flow to the intake manifold 103.

Figure 5:
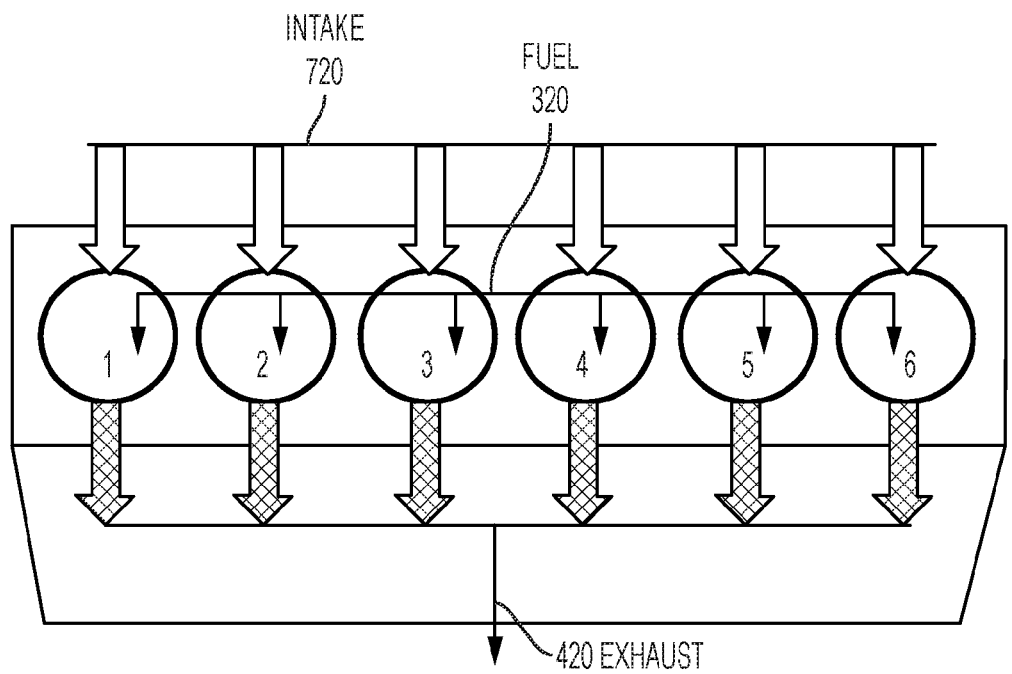
FIG. 5 is an example of a 6-cylinder engine in normal mode.

FIG. 5 shows a normal operation mode for an engine system 10, 12 or 14 or like engine system. Intake fluid 720 is provided to each cylinder 1-6. Each cylinder receives fuel 320 and conducts a combustion cycle. Exhaust 420 exits each cylinder 1-6. A normal mode can be used herein during certain load and speed conditions of the engine, such as when full torque output is desired. Or, as when a cruising mode provides a better temperature or NOx output for the engine system than CDA mode.

Figure 6:
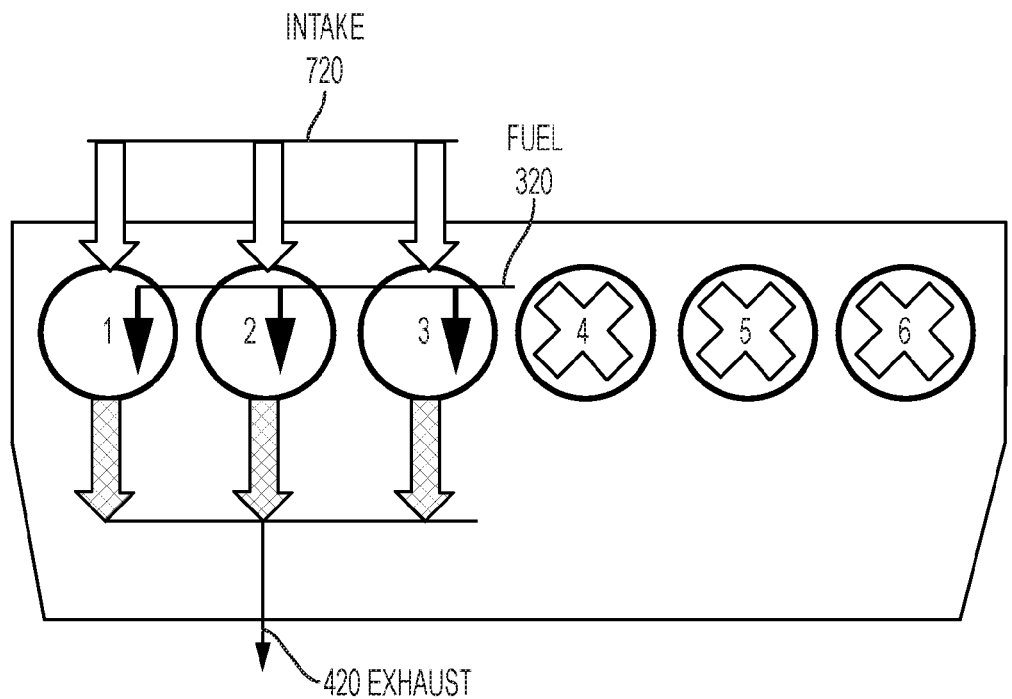
FIG. 6 is an example of the 6-cylinder engine of FIG. 5 in cylinder deactivation mode.

FIG. 6 shows cylinder deactivation mode (CDA). Half of the cylinders are deactivated. Cylinders 1-3 receive fuel commensurate with the torque output requirement. When the engine is required to maintain a certain torque level, and CDA mode is implemented, it is possible to deactivate cylinders 4-6 while doubling fuel to cylinders 1-3. Because of fuel economy benefits that inure from decreased friction on the totality of cylinders, it is possible to provide less than double the fuel to the firing cylinders 1-3 to obtain the same torque level as firing all six cylinders in normal mode. For example, when shutting off half of the cylinders, the firing cylinders could receive 1.95 times more fuel to maintain steady torque output during deactivation. So, CDA mode yields a fuel economy benefit by decreasing fuel use for a desired torque output.

Intake and exhaust valves 130, 150 move as controlled by VVA 200 for firing cylinders 1-3. However, intake and exhaust valves 150 are not actuated for cylinders 4-6.

Figure 11:
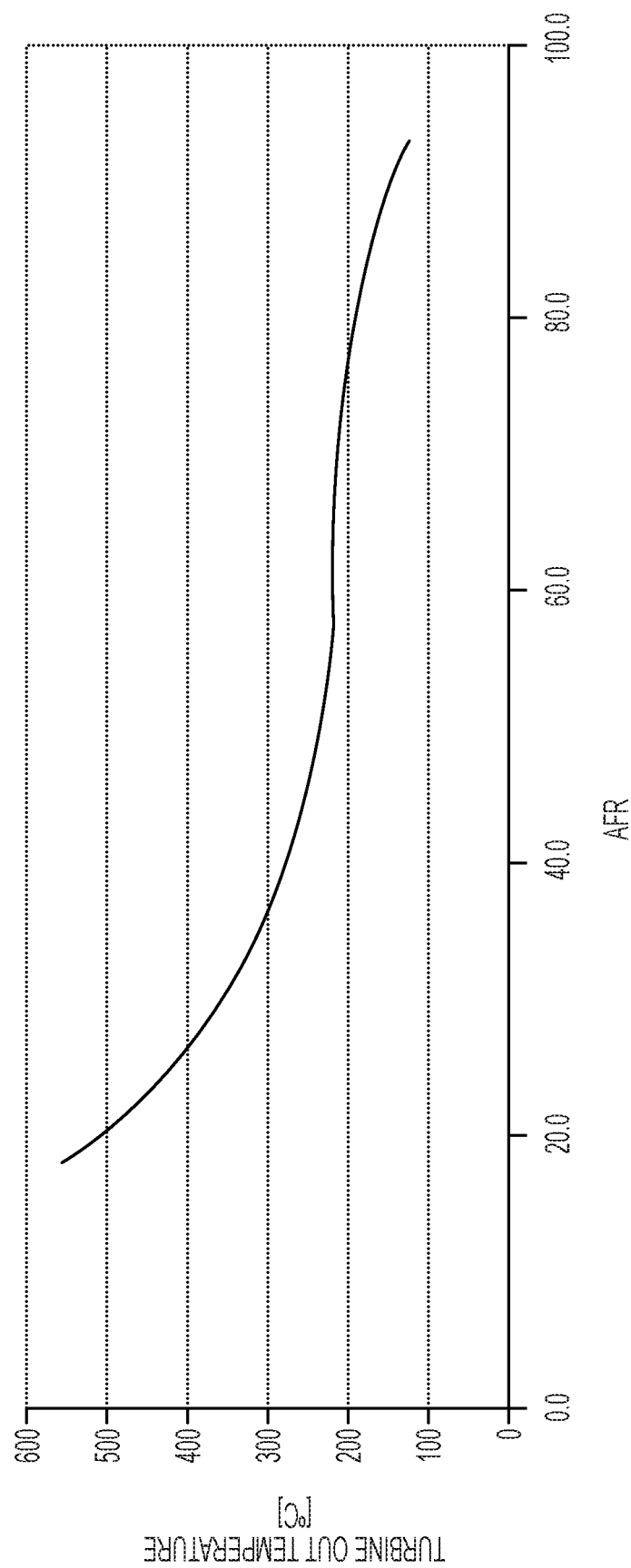
FIG. 11 illustrates a polynomial curve linking turbine out temperature to air fuel ratio.

Increasing the fuel to cylinders 1-3 makes the mixture in the cylinders 1-3 more "rich." The air fuel ratio for the cylinder is lower, because there is less air and more fuel. The resulting exhaust is hotter, as shown in FIG. 11. As the air fuel ratio nears a lower limit, the turbine out temperature (TOT) increases. Diesel engine system 14 does not use a turbocharger 501, and so "turbine out temperature" is used as a phrase of convenience to indicate the exhaust temperature at a location a turbine 501 would be. The TOT follows a polynomial curve as AFR increases.

Unlike gasoline engines, which must be a stoichiometric 17:1 AFR (seventeen parts air to one part gasoline), diesel systems can vary the AFR and still work. The AFR in a firing cylinder can range from 17:1-100:1 (seventeen parts air to one part diesel fuel up to 100 parts air to one part diesel fuel). Soot is an issue at low AFR, and so it is beneficial to keep the AFR 22:1-24:1 when high temperature operation is desired. To avoid soot, adjusting the air fuel ratio to a firing cylinder comprises adjusting one or both of the intake gases and the fuel injection to maintain an air fuel ratio of seventeen parts air to one part fuel or greater. CDA mode can operate with an AFR between 17:1-70:1, or 20:1-50:1. Another AFR range is 24:1-45:1. One AFR range for providing an aftertreatment catalyst bed temperature around 300 degrees Centigrade is 30:1-45:1 AFR.

Because of the polynomial relationship between AFR and TOT, it is possible to develop a control algorithm for sensing a low temperature condition and adjusting the air fuel ratio to bring the exhaust temperature to a desired range. Using the above exhaust gas recirculation (EGR) controller 400, fuel injection controller 300 and intake assist controller 600 is one aspect of regulating the exhaust temperature. Entering cylinder deactivation (CDA) mode on select cylinders is another aspect of adjusting AFR and TOT.

FIG. 16A contrasts normal operation mode for a 6-cylinder engine (triangles) against a 3 cylinder CDA mode (circles). The load (torque in foot-pounds) is compared to the TOT in degrees Centigrade. 6-cylinder mode has lower TOT than 3-cylinder CDA mode. Implementing the method of FIG. 4A thus improves TOT. Additional TOT advantages inure when the methods of FIG. 4B are implemented.

Figure 12:
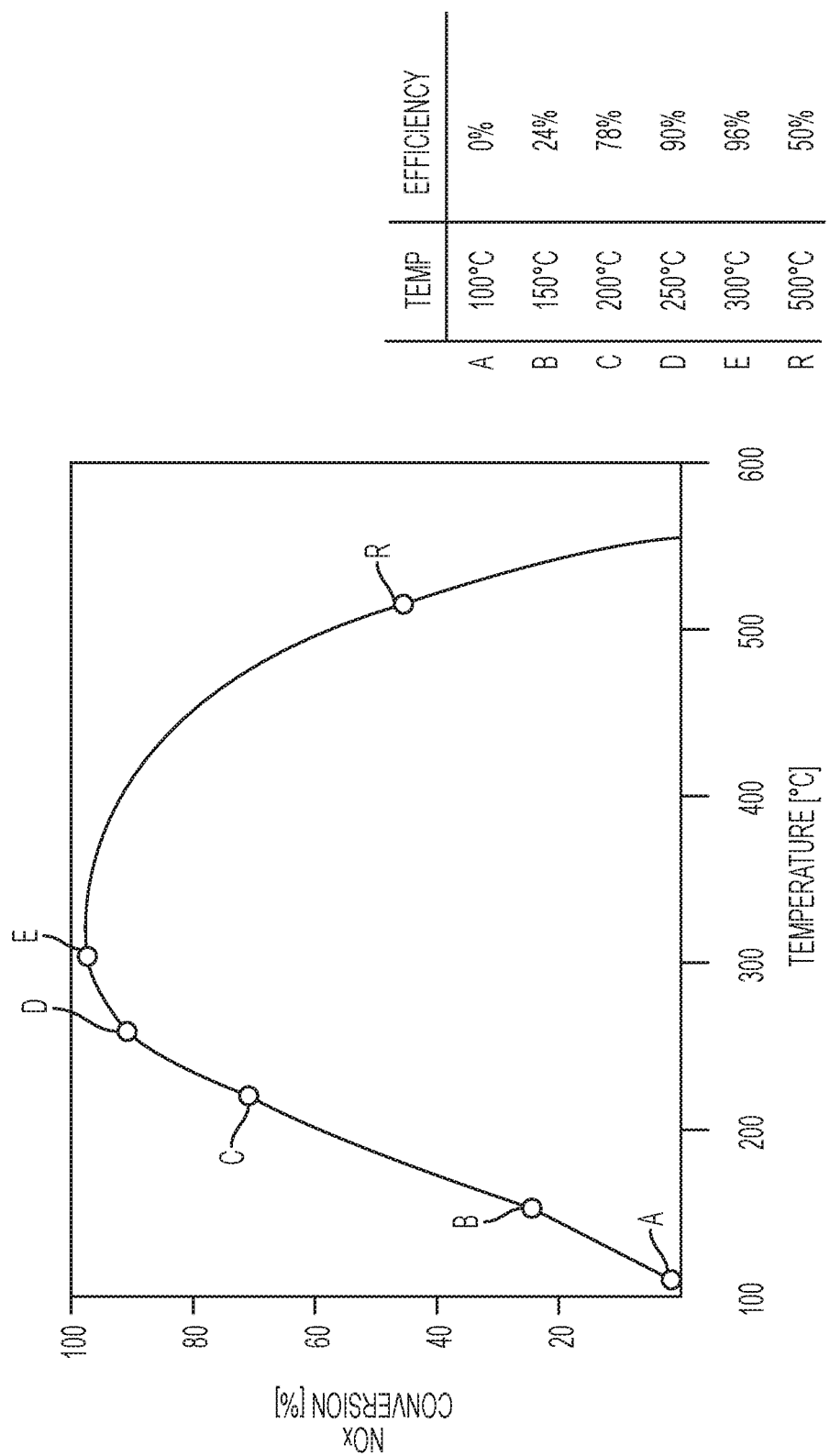
FIG. 12 is an example of NOx pollution conversion efficiency versus temperature for a catalyst.
Figure 16C:
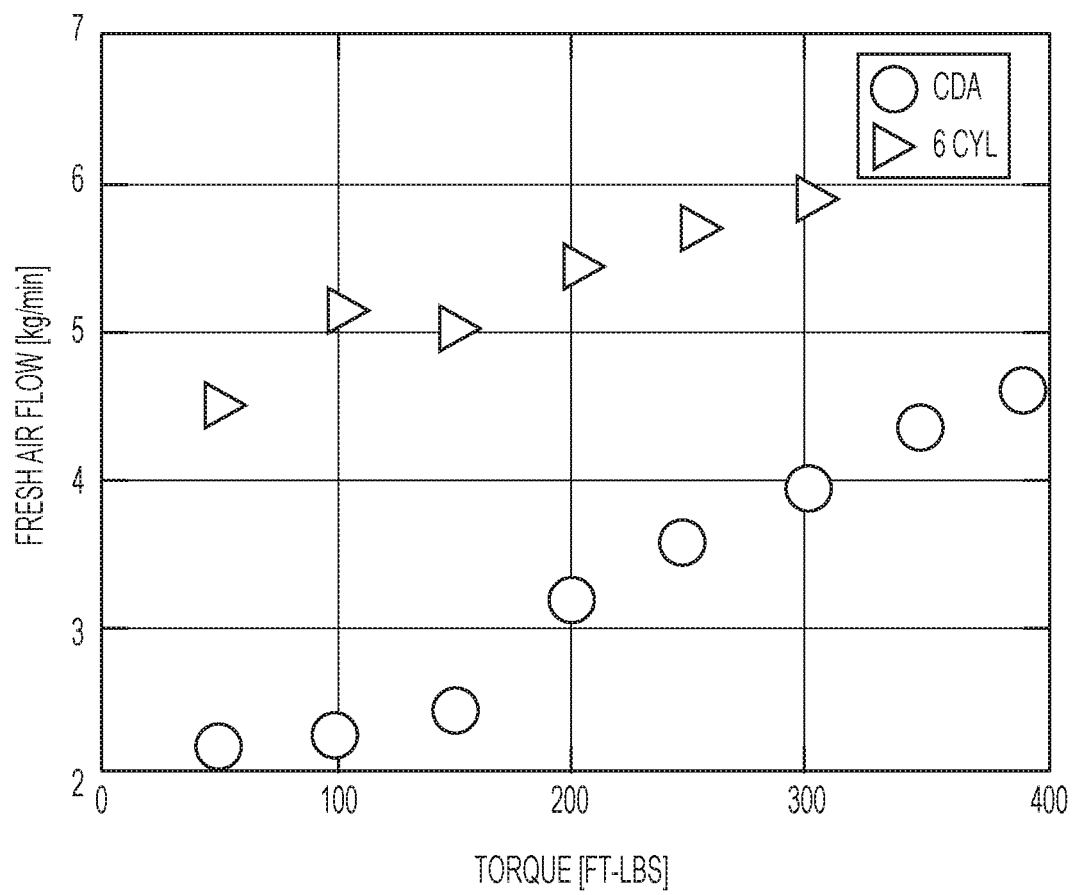

Entering CDA mode reduces air flow through the engine 100. This is shown in FIG. 16C, where for a given load (torque in foot-pounds), the fresh air flow (in kilograms per minute) is shown for a 6-cylinder mode (triangles) for an engine and for a 3-cylinder CDA mode (circles). Using all 6 cylinders draws more air through the engine. Less air is drawn through the engine in CDA mode and pushed in to the exhaust manifold 105, because the intake and exhaust valves 130, 150 are deactivated to CDA mode cylinders. This reduces the flow rate of the exhaust 420. The exhaust 420 is more stagnant in the aftertreatment system, and so it lingers in catalyst 800 longer, thereby transferring more pollution and heat to the catalyst 800. A hot catalyst 800 is an efficient catalyst, as shown in the Example of FIG. 12. For a given mixture of catalyst materials (Platinum, Palladium, Rhodium, etc.), the catalyst 800 has an ideal operation temperature range. In this ideal temperature range, the catalyst is the most efficient for capturing pollution. So, controlling the temperature of the exhaust controls the temperature of the catalyst 800, which controls the efficacy of the catalyst 800 to capture pollution. Moving in and out of CDA mode controls the exhaust temperature by adjusting the AFR in each cylinder. Additionally controlling the AFR via one or more of EGR valves, intake assist devices, and fuel injection further impacts the exhaust temperature and pollution capture.

FIG. 12 shows one example of a catalyst 800. Adjusting the filtration materials of the catalyst 800 will shift the illustrated line. For the example, the catalyst 800 has a "bed" of material through which the exhaust 420 passes. The heat of that "bed" impacts the efficiency of the pollution capture. Nitric and Nitrous Oxides (NOx) is the target pollutant of FIG. 12. Other pollutants, such as Sulphur or hydrocarbons can be target pollutants, among others. At 100 degrees Centigrade, the catalyst is 0% efficient to capture NOx (point A). At 150 degrees, the catalyst converts only 24% NOx (point B). Raising the exhaust temperature to 200 degrees Centigrade (point C) brings NOx conversion efficiency up to 78%, with 90% efficiency at 250 degrees (point D) and 96% efficiency at 300 degrees Centigrade (point E). For the example catalyst, it is therefore ideal to have an exhaust temperature near 300 degrees Centigrade.

Material selection limits at what temperature the catalyst is efficient, at what temperature the catalyst is ruined via sintering effects, and at what temperature the catalyst can conduct diesel particular regeneration (DPR). Regeneration processes burn off pollutants at a high heat, which limits the pollutant's atmospheric entry and environmental pollution. Burning off the pollution renews the catalyst 800 to capture pollution anew. FIG. 12 shows that at a regeneration temperature of 500 degrees Centigrade, the catalyst is only 50% efficient at capturing NOx.

Figure 7:
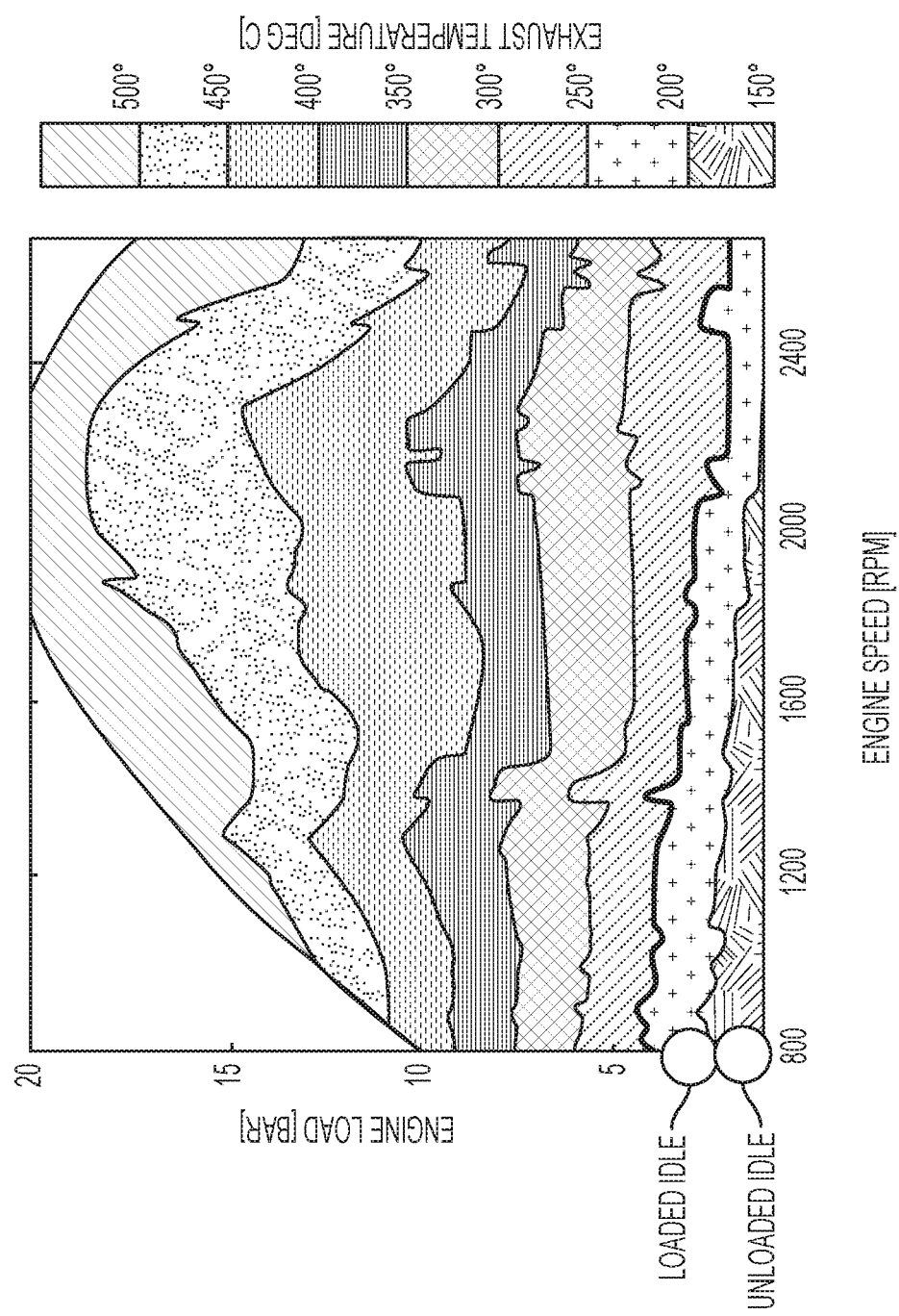
FIG. 7 is an example of exhaust temperature profile for an example engine.

In certain load modes for the engine system, exiting normal mode and entering CDA mode can raise exhaust temperature 100 degrees Centigrade. The impact can be seen by turning to FIG. 7. An engine can idle at a speed dependent on the engine build, and the example of FIG. 7 shows an engine having a speed from 800 rotations per minute (RPM) to over 2400 RPM. The example also uses an engine load from zero to 20 bar. Other engine set-ups are contemplated, and can vary based on engine application and duty cycle. For example, a passenger bus can run at a different range of RPMs than a dump truck. The load at idle, such as when the bus adjusts during pick-up, can differ from the load at idle for tipping the dumper of a dump truck. Since the CDA mode strategy can be applied to a variety of light, medium duty, long haul and heavy duty applications, the example of FIG. 7 is not shown to restrict the claims to a single range of RPMs versus load. FIG. 7 shows that the engine runs below the ideal catalyst bed temperature of 300 degrees Centigrade, shown in FIG. 12, for a significant operation range. Without sufficient load, the example engine does not generate enough heat to efficiently capture NOx.

Off-highway vehicles, such as forklifts, graders, pavers, harvesters, mowers, construction equipment, farming equipment, etc. operate for a significant amount of time at a load insufficient to heat the catalyst to its ideal temperature. But, one cannot simply adjust the catalyst to a different material because the vehicles have excursions to higher temperatures, and thus the catalyst 800 need to withstand higher temperatures without damage.

The unloaded idle mode (point UI) can have a high tailpipe pollution emission because the engine exhaust is far below the ideal catalyst temperature. Entering CDA mode to deactivate at least one cylinder adds instant heat to the exhaust by increasing the fuel efficiency of the engine. By adjusting the AFR to the firing cylinders, an additional 100 degrees Centigrade of heat can be instantly added to the exhaust. Recalling the curve of FIG. 12, the additional heat dramatically increases the pollution filtration at unloaded idle. The example loaded idle mode (point LI) has a 200 degree Centigrade exhaust temperature. Adding 100 degrees to this would bring the catalyst efficiency near its peak. Thus, adjusting the number of cylinders in CDA mode and adjusting the fuel to the remaining firing cylinders permits pollution filtration tailoring via thermal management of the catalyst 800.

The instant heat-up via CDA mode can be applied to diesel particulate filter (DPF) regeneration techniques. Instead of idling a vehicle to run a DPF regeneration cycle, computer control can initiate CDA mode during select operation modes or at select operation times. Further tailoring of the AFR augments the heat added to the exhaust. And, point R, an ideal DPF regeneration point, is more easily achieved without the use of a fuel doser or idle cycle.

It is possible to implement a method for monitoring exhaust temperature, wherein the air fuel ratio to a firing cylinder is adjusted to raise the exhaust temperature or to maintain the exhaust temperature above a threshold temperature. It is possible to monitor a pollution level exhausting from the diesel engine and to adjust the number of cylinders entering cylinder deactivation mode to reach a target pollution level. It is further possible to adjust the air fuel ratio to the at least one firing cylinder based on reaching the target pollution level.

It is possible to monitor an exhaust flow rate through the aftertreatment system, and to adjust the number of cylinders entering cylinder deactivation mode to reach a target exhaust flow rate.

Figure 4A:
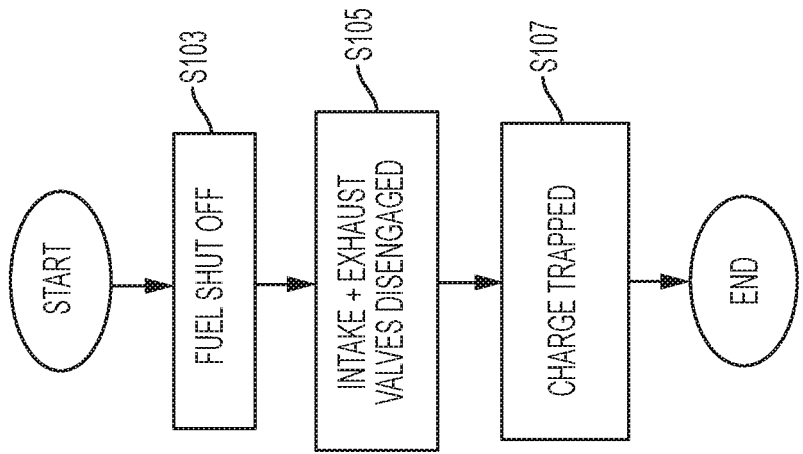
FIGS. 4A & 4B are example methods for implementing cylinder deactivation.
Figure 4B:
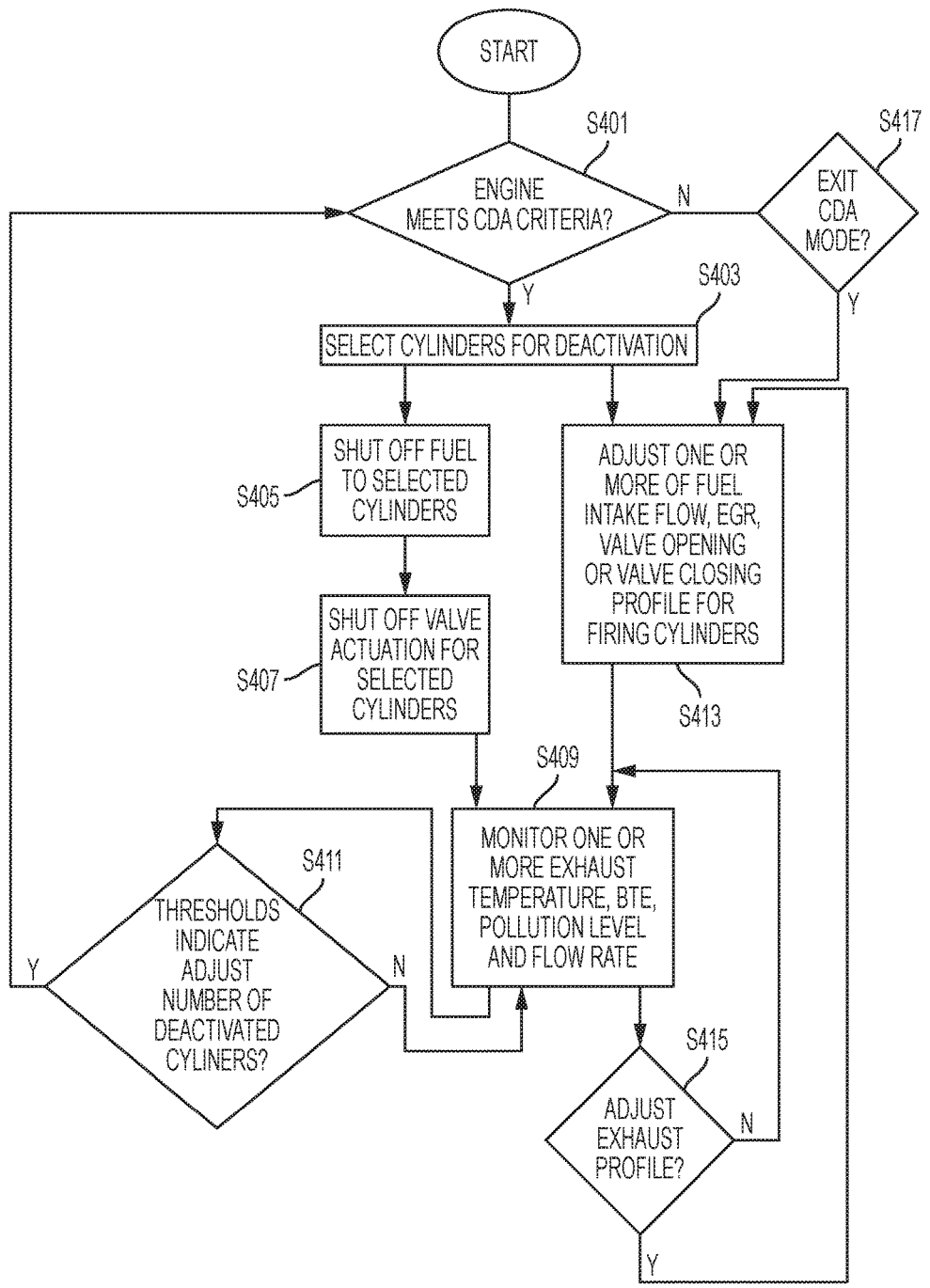

FIG. 4A summarizes steps for entering cylinder deactivation. In step S103, fuel is cut off to a selected cylinder. In step S105, intake and exhaust valves are disengaged from actuation, whether by electric or hydraulic means, such as e-solenoid, electric latch, hydraulic latch, cam selection, disabling a controllable lift mechanism, a cam-camless actuator, a hybrid electro-hydraulic system, or like means. A quantity of intake flow is trapped in the deactivated cylinder and the example of step S107 of FIG. 4A traps a charge of air.

Figure 14:
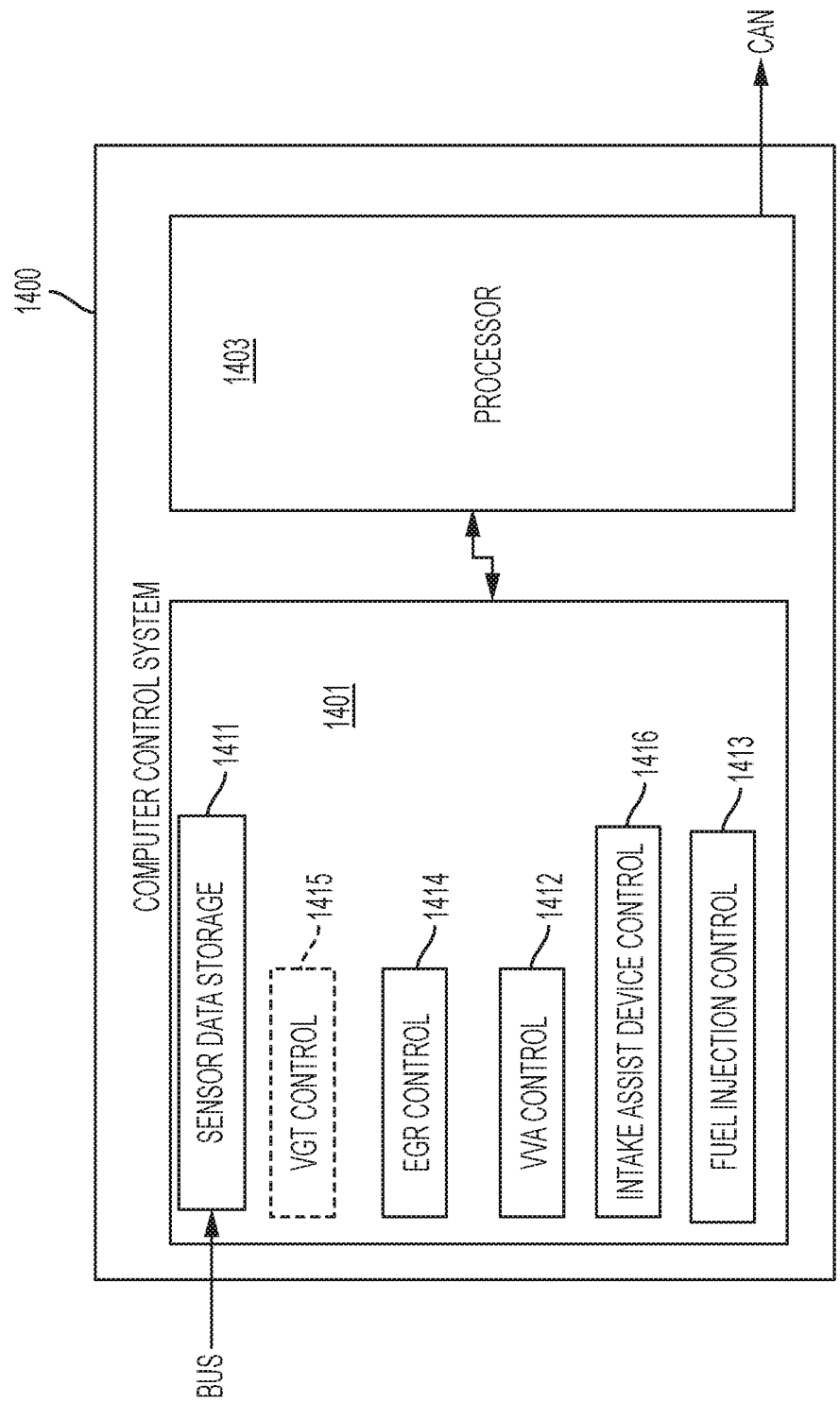
FIG. 14 is a schematic of a computer control system for an engine system.

The method of FIG. 4A can be used alone to increase fuel efficiency and pollution control for an engine. But, FIG. 4B shows cylinder deactivation combined with additional control benefits. In step S401, the control system 1400, which can be a dedicated on-board computer, a subsystem of the Electronic Control Unit (ECU), or other programmable circuitry, decides whether the engine load meets criteria for entering CDA mode. The computer control system 1400 can be as summarized in FIG. 14, such that sensor data is collected from various sensors, including intake manifold sensor 173, exhaust manifold sensor 175, and exhaust sensor 807 and sent along a BUS or like wiring to sensor data storage.

Memory device 1401 is a tangible readable memory structure, such as RAM, EPROM, mass storage device, removable media drive, DRAM, hard disk drive, etc. Signals per se are excluded. The algorithms necessary for carrying out the methods disclosed herein are stored in the memory device 1401 for execution by the processor 1403. When optional variable geometry turbocharger control is implemented, the VGT control 1415 is transferred from the memory 1401 to the processor for execution, and the computer control system functions as a turbocharger controller. Likewise, the computer control system 1400 implements stored algorithms for EGR control 1414 to implement an EGR controller; implements stored algorithms for intake assist device control 1416 to implement intake assist controller; implements stored algorithms for fuel injection control 1413 to implement fuel injection controller. When implementing stored algorithms for VVA control 1412, various intake valve controller and exhaust valve controller strategies are possible relating to valve timing and valve lift strategies, as detailed elsewhere in this application, While the computer control system 1400 is illustrated as a centralized component with a single processor, the computer control system 1400 can be distributed to have multiple processors, or allocation programming to compartmentalize the processor 1403. Or, a distributed computer network can place a computer structure near one or more of the controlled structures. The distributed computer network can communicate with a centralized computer control system or can network between distributed computer structures. For example, a computer structure can be near the turbocharger 501 for VGT control 500, another computer structure can be near the EGR valve 410 for EGR controller 400, another computer structure can be near the intake and exhaust valves for variable valve actuator 200, yet another computer controller can be placed for fuel injection controller 300, and yet another computer controller can be implemented for intake assist controller 600. Subroutines can be stored at the distributed computer structures, with centralized or core processing conducted at computer control system 1400.

If the engine system meets CDA criteria, as by having an appropriate load or crankshaft RPM, or both, the computer control system selects the number of cylinders that can be deactivated while meeting current load and RPM requirements in step S403. Additional factors to consider are one or more of whether the exhaust temperature is within a threshold range or at a target temperature, whether the brake thermal efficiency (BTE) is above a BTE threshold, or whether the tailpipe emissions are within a range or at a target level. One strategy deactivates as many cylinders as possible without impacting the torque output of the engine. Another strategy deactivates as many cylinders as possible to maintain as high an exhaust temperature as possible. Another strategy deactivates as many cylinders as possible to have as fuel-efficient operation as possible.

Once the number of cylinders for deactivation are selected in step S403, the fuel injection controller 300 shuts off fuel to the selected cylinders in step S405. A concurrent or consequent adjustment of air fuel ratio (AFR) to the firing cylinders can be made in step S413. The amount of fuel injected in to the cylinders ranges from 0-100%, and is computer controllable by appropriate mechanisms, including sensors, transmitters, receivers, and actuators. Step S413 can additively or alternatively comprise adjusting one or more of the timing or quantity of fuel injection, intake flow, exhaust gas recirculation (EGR), valve opening or valve closing profile (lift or timing) for the firing cylinders. This can comprise the AFR tailoring strategies detailed above and can comprise compressor 512 or intake assist device 601 or exclude turbocharger 501 as appropriate.

With fuel adjustments made, the intake and exhaust valve actuation is shut off for the selected, deactivated, cylinders in step S407. The system monitors one or more of exhaust temperature, brake thermal efficiency, pollution level, exhaust flow rate through the catalyst, etc. in step S409. If it is not possible to adjust the number of deactivated cylinders, the monitoring in step S409 continues, But, if it is possible to deactivate additional cylinders, step S411 determines to do so. For example, the thresholds for temperature, pollution or flow rate could indicate that an increase or decrease in the number of cylinders in CDA would improve exhaust conditions. So, if the thresholds indicate that adjusting cylinders in CDA mode would benefit the target exhaust conditions, the method checks whether other parameters, such as load and RPMs, permit CDA mode by returning to step S401.

In one aspect, and returning to FIG. 5, an engine is generalized and labelled with 6 cylinders in a linear fashion for convenience. In practical implementation, the cylinders are not always linearly aligned. Even when they are, they are not always fired in the sequence numbered in the Figures. That is, the cylinders may not fire in the sequence 1, 2, 3, 4, 5, 6. For example, a firing sequence for an engine in normal operation mode can be 1, 5, 3, 6, 2, 4. In CDA mode, cylinders 4, 5, 6 are deactivated. The remaining cylinders fire in sequence 1, 3, 2. Depending upon where the engine is in its firing sequence, the cylinders selected for deactivation can change between algorithm iterations. So, a first iteration can fire as explained. A second iteration could shift the normal firing sequence to 3, 6, 2, 4, 1, 5. In this sequence, cylinders fire 3, 2, 1, while cylinders 4-6 are deactivated. However, the start sequence for implementing a new CDA mode deactivation sequence could activate deactivated cylinders, and deactivate firing cylinders. A sequence of 5, 3, 6, 2, 4, 1 would fire cylinders in sequence 5, 6, 4, with cylinders 1-3 deactivated. So, not only can the number of cylinders firing and deactivated change, but the cylinders selected for firing and deactivated can change between algorithm iterations.

Returning to the flow diagram, the results of step S409 can be analyzed and a determination can be made in step S415 to decide whether to adjust the exhaust profile. As above, to adjust aspects of the exhaust and its ability to heat the catalyst 800 or have pollution filtered from it, it can be necessary to adjust the engine activity at the cylinder level. And so, if the exhaust profile is to be adjusted, the algorithm returns to step S413. Otherwise, the system continues to monitor as in step S409.

It may be necessary to exit CDA mode altogether, in step S417, as when the load on the engine increases above a threshold. Or, as when the brake thermal efficiency or pollution control is better outside of CDA mode. The system checks whether the engine still meets criteria for implementing CDA mode by returning to step S401. If base criteria are not met, step S417 triggers an exit from CDA mode. The deactivated cylinders receive valve actuation control and fuel injection to return to firing mode. However, the algorithm can continue to check whether AFR adjustments or valve profile adjustments benefit the exhaust profile, as by continuing the flow through steps S413, S409, & S415.

Triggering conditions for entering or exiting CDA mode, or for combining variable valve actuation techniques with normal or CDA mode cylinders, are outlined in FIGS. 7-13. Pollution management is interrelated with AFR and exhaust temperature, and so one triggering condition can impact other triggering conditions. Adjusting one aspect of engine operation can impact more than one threshold range for triggering conditions.

A bold line in FIG. 7 indicates a target temperature for a given catalyst bed composition. Below the bold line, a threshold range for an exhaust temperature range triggers an indication that CDA mode is appropriate for raising exhaust temperature. When the system determines exhaust temperature is below the target temperature, the control system 1400 emits commands to enter CDA, commensurate with other considerations, such as load and RPM requirements. Above the bold line, it is possible to exit CDA mode in favor of other techniques outlined in FIG. 8.

The threshold range can comprise an exhaust temperature range below an ideal catalyst bed temperature. The ideal catalyst bed temperature can be between 200-300 degrees Centigrade, above 200 degrees Centigrade, above 300 degrees Centigrade, or can be an exhaust temperature beneath a diesel particulate filter regeneration temperature. In this last instance, the diesel particulate filter regeneration temperature can be around or above 500 degrees Centigrade. Outside the temperature threshold range, it is possible to exit CDA mode.

An exhaust temperature sensor 807 in combination with the control system 1400 can receive and process exhaust temperature data from the exhaust temperature sensor. Based on the exhaust temperature data, commands can be adjusted to the fuel injector to adjust the quantity of fuel injected to active combustion cylinders of the plurality of combustion cylinders. Also, commands can adjust the number of combustion cylinders selected for deactivation.

Figure 8:
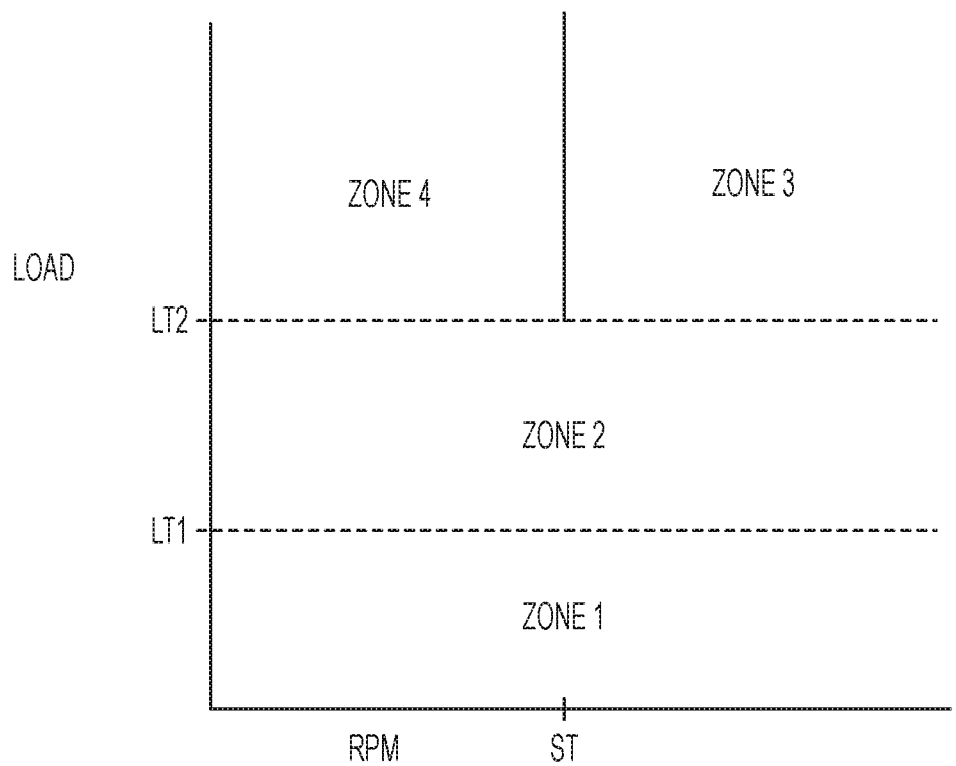
FIG. 8 is an example of load thresholds for implementing cylinder deactivation modes, normal mode, or augmented modes.

Turning to FIG. 8, one implementation strategy is shown for triggering various operation modes for the engine. Similar to FIG. 7, the control system 1400 can enter CDA mode whenever the load on the engine is below a first load threshold LT1. CDA mode can be entered across the entire engine speed operating range, in rotations per minute (RPM), from an idle mode up to a maximum engine crankshaft rotations per minute. Zone 1 comprises idle, low load, and loaded idle modes. CDA mode can be used alone or with EGR boosting, so as to lower the AFR and raise exhaust temperature. Optimizing fuel use in the firing cylinders, as by adjusting fuel injection, permits optimal fuel efficiency and high heat exhaust. Reducing cylinders in use reduces flow rate, and so the catalyst can reach points C, D, & E in FIG. 12 despite being in historically problematic Zone 1. Exhaust temperatures are traditionally too low to trap particulates in Zone 1, but the CDA mode techniques described herein increase catalyst activity. While the efficient fuel use increases NOx output in the exhaust, the pollution is more efficiently captured in the catalyst 800.

The triggering conditions of FIG. 13 indicate that as the NOx conversion efficiency of the catalyst increases with the catalyst bed temperature reference, the permissible amount of NOx in the exhaust can increase. Pollution regulations require that engines meet an upper limit 0.2 g/hp-hr (0.2 grams per horsepower hour) NOx emission, or 0.3 g/hp-hr NOx emission, as measured at the tailpipe. The engine can emit (engine-out) NOx over the course of an hour, and the totality of the NOx emission cannot be above the upper limits (NOx pollution thresholds) at the tailpipe of the engine exhaust system. The engine can emit more than the upper limit, but by the time the exhaust reaches the tailpipe, the NOx level must be reduced below the pollution threshold.

The catalyst 800, when 96% efficient, can receive exhaust having 5.0 grams per horsepower hour NOx and remove enough NOx to stay under the 0.2 g/hp-hr upper limit. Likewise, when the catalyst is 96% efficient, the catalyst can receive 7.5 g/hp-hr NOx from the exhaust manifold, yet filter pollution to stay under the 0.3 g/hp-hr upper limit. The amount of NOx pollution from the engine that can be filtered decreases as the catalyst efficiency decreases. So, by using the catalyst temperature as a determinative threshold, and maintaining the catalyst temperature within a target threshold range, or at a target temperature, the firing cylinders can be run in high fuel efficiency mode (high temperature, high NOx output) without increasing pollution at the tailpipe. The algorithm of FIG. 4B can include in steps S415 and S411, processes to manage pollution at the tailpipe. The results of the monitoring step S409 can be processes to ensure that the NOx for the horsepower-hour does not exceed the pollution threshold, as by adjusting fuel efficiency, exhaust temperature, fuel injection, intake flow, number of cylinders in CDA mode, etc. Low NOx modes, such as a lower fuel efficiency mode, can be selected over higher NOx modes to ensure that the tailpipe emission pollution threshold is met for the requisite time frame. For example, when the catalyst bed temperature is in an ideal range, it is possible to suspend CDA mode, or to decrease fuel efficiency to reduce the amount of NOx exiting the engine. There is then less NOx for the catalyst to filter, and more pollution is trapped in the catalyst. Thus, the control algorithm is configured to processes pollution level data to iteratively adjust the commands to one or more of the fuel injector 310, intake assist device 601, VGT turbocharger 501, EGR valves 412, 414, or 410, or valve actuators until the pollution level is below the pollution threshold.

Returning to FIG. 8, Zone 2 indicates a second load threshold LT2. A medium load, such as a 50% load mode, can be the second load threshold LT2. In zone 2, CDA can be used across the engine speed operating range. Intake assist device 601 can boost AFR to meet torque output requirements for the engine.

A load monitoring sensor such as crankshaft sensor 107 can determine a load on the engine. The control algorithm can receive load data from the crankshaft sensor 107 and determine a load on the engine. The control system 1400 can determine an engine output requirement based on the load on the engine. When a load on the engine is below a first load threshold LT1, the control system 1400 can adjust the number of the plurality of combustion cylinders selected for deactivation to meet engine output requirements. When a load on the engine is above the first load threshold LT1, the control algorithm is configured to boost intake flow to the intake manifold. When the load on the engine is above a second load threshold LT2, the control algorithm exits CDA mode.

Figure 9:
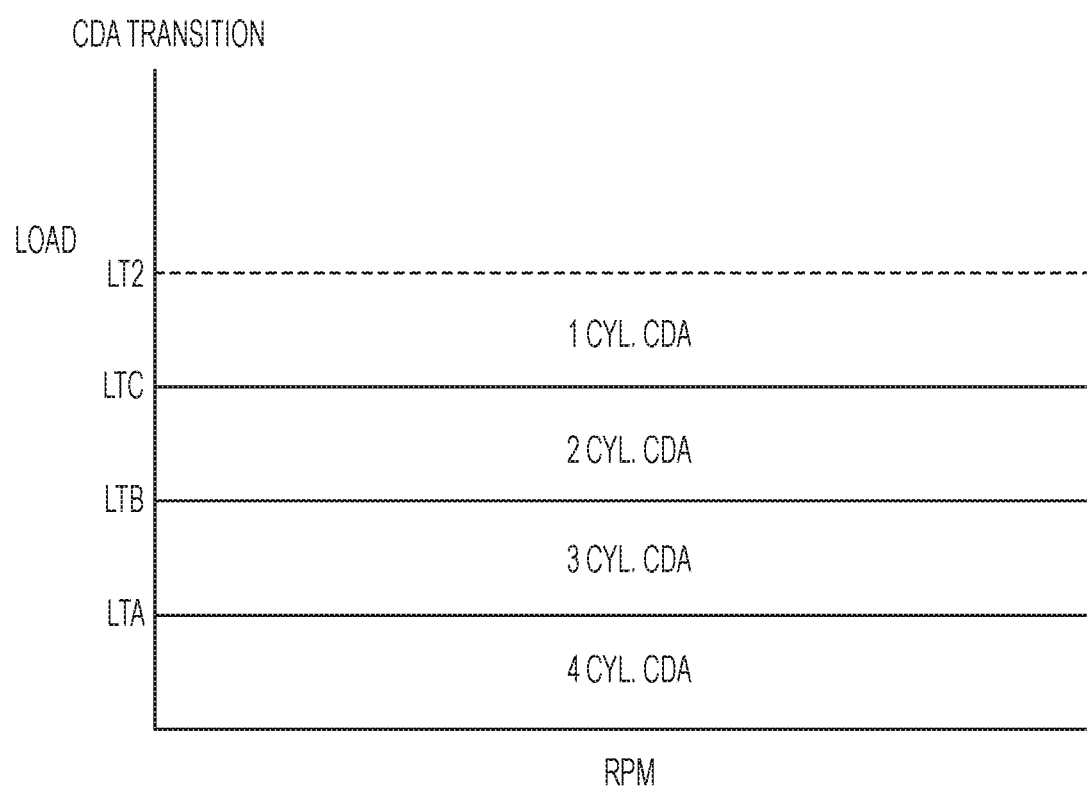
FIG. 9 is an example of load thresholds versus the number of cylinders in cylinder deactivation mode.

The load on the engine can impact the decision to enter CDA mode in a variety of ways. Comparing FIGS. 8 & 9 illustrates this. FIG. 8 breaks the load versus RPM in to Zones 1-4 with load thresholds LT1 & LT2. FIG. 9 correlates load to one example of the number of cylinders deactivated in CDA mode. Above second load threshold LT2, CDA mode is not used. The engine requires more torque output than can be provided in CDA mode. All cylinders are firing to accommodate the load.

The control system 1400 can monitor the engine operating mode. A threshold range for entering CDA mode can comprise one or more of an idle engine operating mode threshold LTA, a loaded idle engine operating mode threshold LTB, and a loaded engine operating mode threshold LTC. The number of cylinders of the multiple-cylinder diesel engine entering cylinder deactivation mode is adjusted based on whether the engine operating mode is the idle engine operating mode, the loaded idle engine operating mode, or the loaded engine operating mode. FIG. 9 shows one example of the load thresholds versus number of cylinders deactivated. While even numbers of cylinders are shown, other numbers, such as odd numbers or single-digit numbers of cylinders can be selected for deactivation.

Engine operating modes can comprise a lightly loaded mode, a medium load mode, and a heavy duty load mode, and the threshold range for entering CDA can comprise the lightly loaded mode and the medium load mode. An engine operating mode can also comprise a start-up mode, and the threshold range for entering CDA can comprise the start-up mode.

Determining whether to enter CDA can comprise monitoring an engine crankshaft speed via crankshaft sensor 107. When a threshold range comprises a high speed threshold range above ST and a low speed threshold range below ST, the number of cylinders entering cylinder deactivation mode is adjusted based on whether the engine crankshaft speed is within the high speed threshold range of the low speed threshold range.

A normal operating mode can be used in Zone 4, especially when an engine is optimized for operation in Zone 4, such as a cruising mode. An augmented mode can be used in Zones 1-3, in Zones 2 & 3 only, or in Zone 3 only. The augmented mode applies the principles of steps S409, S415, & S413 to adjust the valve opening or valve closing profile to impact fuel efficiency. Above threshold speed ST, Zone 3 is used. Below threshold speed ST, Zone 4 techniques are used.

Figure 15:
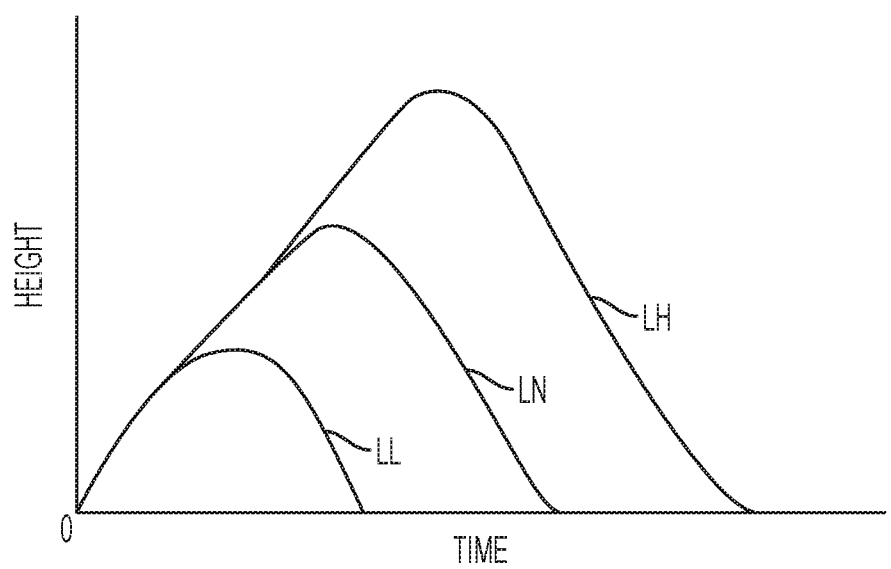
FIG. 15 is an example of possible intake or exhaust valve lift profiles.

The techniques of the augmented mode can adjust the valve profiles, as summarized in FIG. 15. Each valve can have its lift height adjusted and time it is open adjusted. The example of FIG. 15 shows an early closing profile in combination with a low lift in profile LL. A normal lift and normal opening and closing profile LN is also shown. A late valve closing with a high lift profile LH is shown. Other valve profiles are possible, so FIG. 15 is exemplary and not restrictive of the range of profiles possible on the intake and exhaust valves. The lift and the timing of intake or exhaust valve opening or closing can be tailored to the engine operating conditions. As outlined above for the variable valve actuator (VVA) 200, augmented mode techniques can comprise Early Intake Valve Opening (EIVO), Early Intake Valve Closing (EIVC), Late Intake Valve Opening (LIVO), Late Intake Valve Closing (LIVC), Early Exhaust Valve Opening (EEVO), Early Exhaust Valve Closing (EEVC), Late Exhaust Valve Opening (LEVO), Late Exhaust Valve Closing (LEVC), a combination of intake valve actuation timing and exhaust valve actuation timing, such as EEVC and LIVO adjusts (Negative Valve Overlap (NVO)). The one technique for operating the engine system comprises exiting cylinder deactivation mode when the diesel engine system is operating outside a threshold range, such as second load threshold LT2, and entering an early intake valve closing mode. Another technique exits cylinder deactivation mode when the diesel engine system is operating outside a threshold range, such as second load threshold LT2, and entering a late intake valve closing mode.

Cylinder deactivation requires an implementation strategy for optimal trade-offs between BSFC (Brake Specific Fuel Consumption) & NOx & TOT (turbine out temperature). Early Intake Valve Closing (EIVC) and Late Intake Valve Closing (LIVC) yield good BSFC. It is possible to use these techniques at high speed and high load conditions. While NOx is higher for EIVC and LIVC, the catalyst is heated to an ideal filtering range via the CDA at start-up and low load. The catalyst can filter the increased NOx for a net tailpipe emission within the desired regulatory limits.

Figure 10:
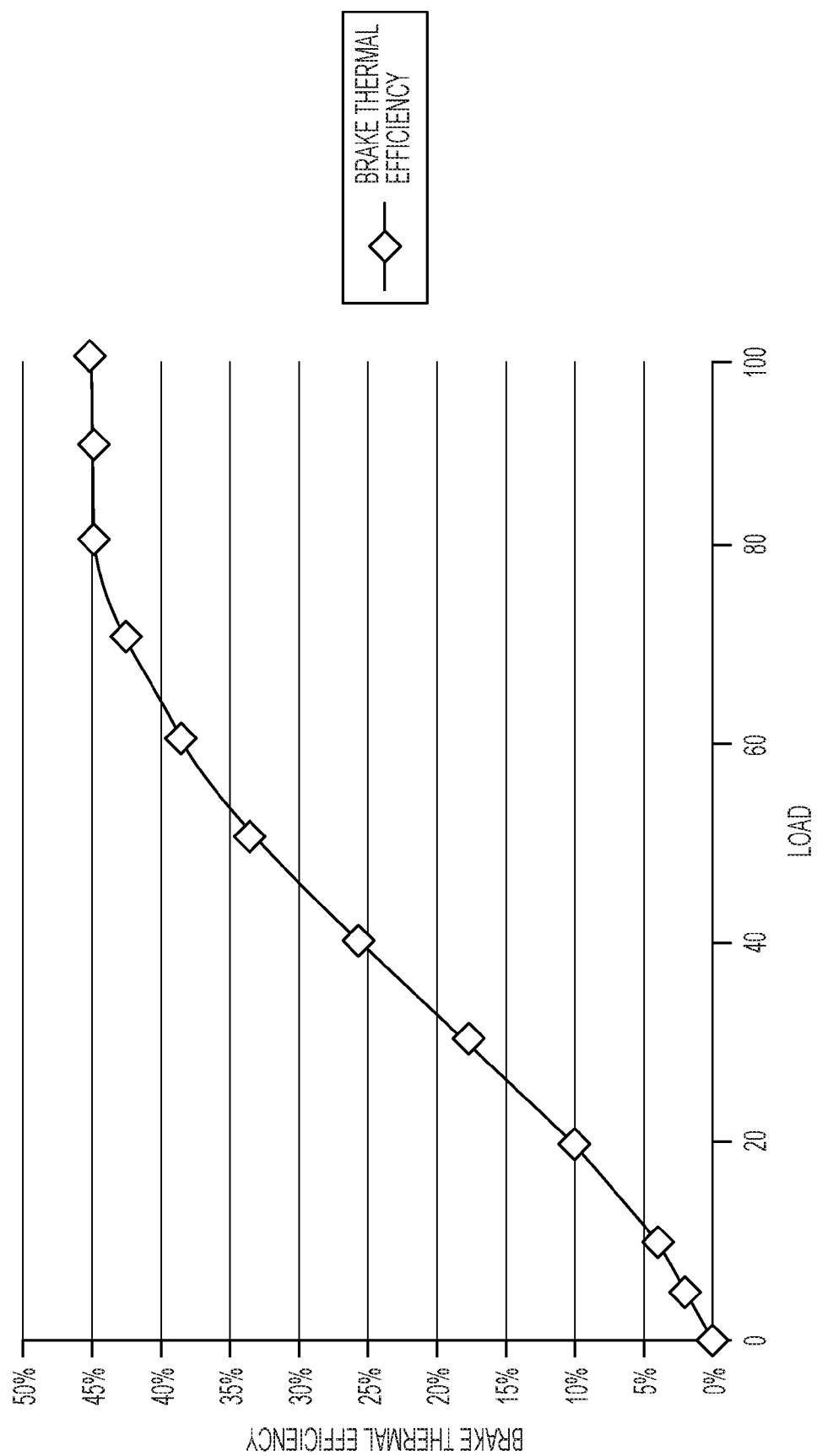
FIG. 10 illustrates an example brake thermal efficiency versus load for an engine.
Figure 16D:
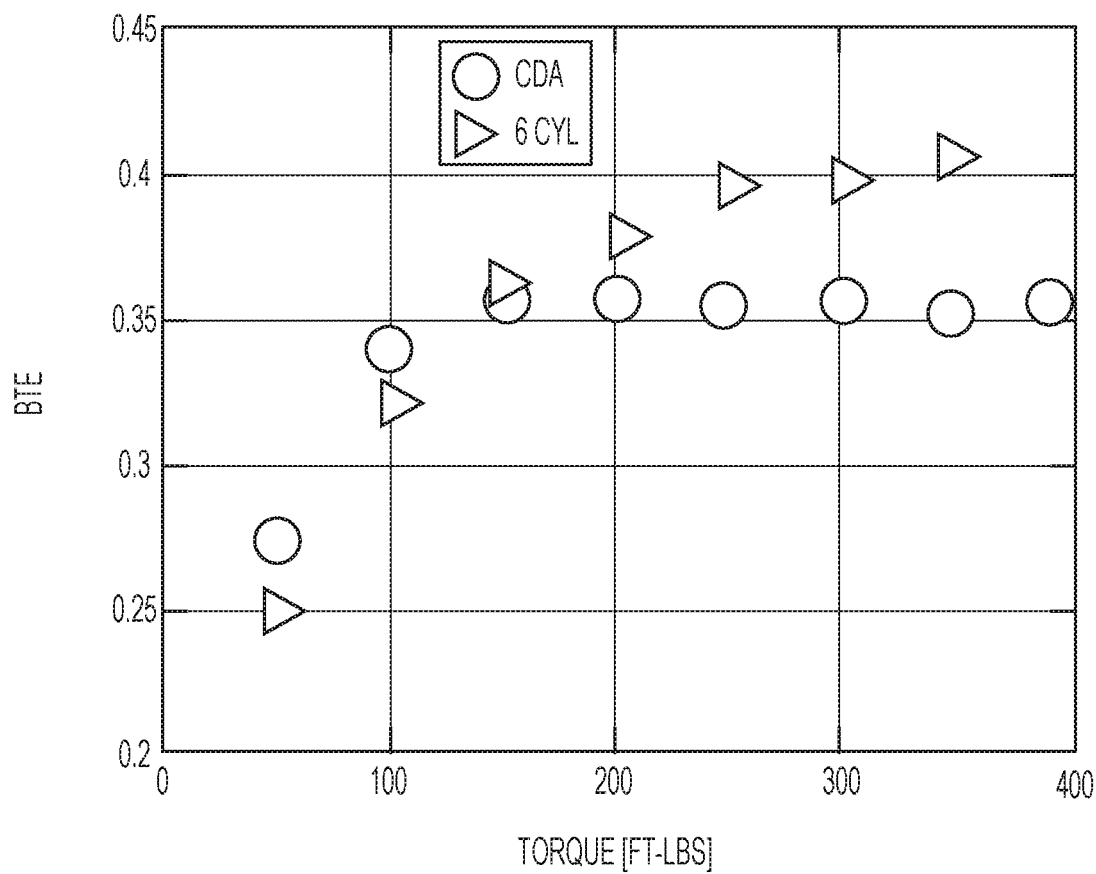

As FIG. 10 shows, the brake thermal efficiency (BTE) of the engine increases as the load increases. The scale for the load differs from FIG. 7. FIG. 7 shows an example load in bars (pressure). But FIG. 10 shows load in a percentage relative to the engine's load capacity. So, the engine has a load range from 0-100% of its capacity. The BTE increases the closer the engine gets to its maximum load capacity. The BTE can be a triggering condition for entering or exiting CDA mode. A load below a threshold BTE triggers entry in to CDA mode for a threshold range of BTE values. Above the BTE threshold, the engine system exits CDA mode to take advantage of high load, high BTE efficiency operating conditions. FIG. 16D contrasts brake thermal efficiency (BTE) between normal all cylinders-firing mode (triangles) and CDA mode (circles) for an example 6-cylinder engine. In FIG. 16D, CDA mode outperforms normal operation mode under a threshold. Reducing the number of firing cylinders increases BTE for the example engine system when the load is less than 200 foot-pounds of torque. Above 200 ft-lbs torque, it is beneficial to use normal operation with all cylinders firing.

FIG. 7 correlates the high load condition against the exhaust temperature to show that the catalyst bed is working efficiently for much of the high load output of the engine. Catalyst bed temperature is high enough to capture pollution, and so monitoring BTE and regulating CDA mode based on BTE impacts the temperature of the catalyst and the engine system's ability to regulate pollution. Monitoring a brake thermal efficiency permits steps for adjusting the air fuel ratio to a firing cylinder based on maintaining the brake thermal efficiency above a brake thermal efficiency threshold. CDA mode can bring the BTE up to the threshold for lower loads, and when a load threshold is crossed, CDA mode is exited in favor of firing all cylinders.

Other triggering events for entering or exiting CDA mode can include monitoring an accelerator position, and wherein the threshold range comprises a subset of accelerator positions. A certain rate of acceleration causes a load on the engine, and so CDA mode can be linked to the accelerator as it can be linked to the load. Other user inputs, such as buttons, levers and other user inputs can trigger a threshold range for entering CDA mode. For example, the user can select DPF regeneration mode, which causes the engine system to enter CDA to reach a target DPF regeneration temperature, such as point R in FIG. 12, or another target temperature suitable for the catalyst contents.

Exiting CDA mode can comprise deselecting the combustion cylinders selected for deactivation, commanding the injection controller to activate the respective fuel injector for the at least one of the deselected combustion cylinders, commanding the intake valve controller to activate the respective intake valve for the at least one of the deselected combustion cylinders, and commanding the exhaust valve controller to activate the respective exhaust valve controller for the at least one of the deselected combustion cylinders. The control algorithm is further configured to adjust commands to the fuel injector to adjust the quantity of fuel injected to active combustion cylinders of the plurality of combustion cylinders based on the engine output requirement. As the cylinders exit CDA mode, the fuel injector 310 is controlled to redistribute fuel based on engine load requirements.

The control algorithm can comprise instructions to receive air flow data from an air flow sensor such as intake manifold sensor 173. The control system 1400 can determine an air flow amount to respective intake valves, determine an air fuel ratio for each of the plurality of combustion cylinders based on the determined air flow amount and based on the fuel injector commands, and, based on the determined air fuel ratio, command the intake assisting device to increase air flow to the plurality of combustion cylinders when the load on the engine is within a predetermined range. Based on the determined air fuel ratio, the control system can adjust commands to the fuel injector 310 to adjust the quantity of fuel injected to active combustion cylinders of the plurality of combustion cylinders.

Returning to FIG. 8, Zone 2, in a normal low load condition, the air to fuel ratio (AFR) can be 80 parts air to one part fuel (80:1). In a CDA mode, the AFR cuts in half, which increases the heat of combustion. A medium load can have an AFR of 40:1. Lowering the AFR increases the temperature of the exhaust (TOT or turbine out temperature), which can benefit the ability of the catalyst to collect undesirable emissions. But, going to or below 20:1 AFR increases exhaust emissions and is not desired. So simply entering CDA on half of the cylinders in a medium load could generate too much soot. It is beneficial to run an intake air assist device during CDA mode to more effectively regulate the AFR. The benefit of running the intake assist device 601 outweighs the detriment of any increased load on the engine 100 to power the intake assist device 601, as by pulley operated devices. Deactivating half of the cylinders can achieve a high temperature TOT benefit for the exhaust in medium load conditions when the AFR is boosted above the low 20:1 AFR that would occur without intake flow assistance. Without the intake flow assist, using CDA in a medium load would generate soot in the exhaust. Using the intake assist device extends the benefit of CDA mode beyond low load and idle conditions and gives fuel economy benefits despite the drain of powering the intake assist device 601. This is because the exhaust output is reduced when shutting off cylinders and when reducing fuel use. The amount of exhaust output during CDA mode is insufficient to excite the turbocharger enough to boost the intake flow to a desirable AFR.

The air assisting device acts to supply fresh air in lieu of, or to supplement, the air supplied via turbocharging to raise the ratio of oxygen to fuel. Instead of using CDA only at very low load or idle conditions, CDA use is extended to higher load conditions. The air assisting device is used to raise the air fuel ratio (AFR) from 20:1 to 23:1 or 24:1. For example, using an air pump permits CDA at 25-35% load. A larger range is 25-50% load. This allows a diesel engine to benefit from reduced emissions over a larger operating range and at loads where turbocharging otherwise wouldn't suffice to raise the AFR. The low fuel use and low emissions is possible over a greater engine operating range because the oxygenating source is not dependent on the turbocharger. The intake assist device 601 can be an air pump, a supercharger or even a fan.

Because the duty cycle of the intake air assisting device is very small, for example, 2%, and because the intake air assisting device size is kept very small, for example, 15% the size of the engine or less, there is a net fuel savings. For example, a 15 L, 7 L, or 2 L engine can be paired with a 0.3 L supercharger, a fan, or an air pump. Using an 2 L engine again as an example, the intake air assisting device supplies approximately 0.5 kg/min air flow or less to increase the AFR for the 25-50% load operation. The low, 140-150 kPA intake manifold pressure in this load range permits a low capacity intake air assisting device and results in a low power use.

CDA mode can be used on a six cylinder engine or an eight cylinder engine. CDA can be entered on half of the cylinders, two of the cylinders, etc. The engines can operate with only two firing cylinders. The use of CDA mode creates "an engine within an engine," because a great capacity can be installed on a device or vehicle for high load operation, but computer control strategies reduce the engine fuel use and pollution to that of a much smaller engine for small loads and idle conditions. That is, CDA mode can be used to selectively reduce the engine displacement. But, CDA can also be used to double the load per cylinder, increasing torque output from each cylinder over a normal mode. These assets can reduce emissions, improve fuel economy, and increase TOT.

Yet another benefit of CDA mode is the ability to recover energy of compression. Because charge air or other intake flow is captured in a CDA cylinder, and because the piston 160 is not deactivated, the piston continues to cycle up and down in the deactivated cylinder. The piston follows its stroke cycle, and work is done to compress the charge of air. But the piston springs back, which can augment torque output from the diesel engine by coupling compression spring-back from the piston 160 to the crankshaft 101. This "air spring" effect can return more energy to the crankshaft than friction losses would otherwise rob from a normal mode-activating cylinder. Using CDA mode puts less wear on the engine than engine braking, regular combustion, positive power, or braking loads. Shutting off cylinders preserves them, and running the remaining firing cylinders efficiently is less wear across the engine than running all cylinders inefficiently. To augment the spring-back, it is possible to boost the intake flow to the cylinder prior to deactivating the valves.

NOx Adjustment Strategies Using CDA

A fuel efficient combustion cycle has increased NOx emission. Consumers want good fuel economy, but Federal Regulations require low NOx output. The goals are at odds.

One compromise has been to make the engine less fuel efficient to reduce NOx output, as by adjusting engine timing to retard the engine, or as by exhaust gas recirculation (EGR). Redesigning other system components attempts to increase fuel economy to make up for the loss of fuel efficiency. The other components make up for fuel economy losses in the engine by being more aerodynamic, having less drag, etc. But, in the end, the engine is fuel inefficient.

One issue is that a fuel-efficient diesel (one having low BSFC—brake specific fuel consumption) has increased NOx output. For example, a fuel efficient diesel can output 6-9 grams NOx/engine hour. However, regulations require output of 0.2, and soon to be 0.02 grams NOx/engine hour. Only by having an efficient aftertreatment system can the goal be reached while satisfying consumer demand for fuel efficiency. And so it becomes necessary to heat the catalyst quickly for efficient filtering.

For example, being 8% more fuel-efficient, as measured by BSFC, increases NOx 2 g/hp-hr. Another 8% fuel efficiency increase does the same, and so fuel efficiency/fuel economy can increase 16%, but at a cost of moving from 1 g/HP hr to 5 g/Hp hr NOx. If the catalyst can stay in its most efficient filtering range, the NOx is captured, and the tailpipe emission meets the necessary standards.

In a gasoline engine, CDA would work to reduce pumping losses, and to reduce need for an intake throttle. The benefits would be limited to flow and drag losses. A gasoline engine must be run stoichiometric fuel:air (AFR), and so CDA mode's benefits are more limited.

On a diesel engine, which lacks a throttle, CDA is less about pumping losses, and more about efficient combustion. The diesel engine can have a range of air-fuel ratios. The AFR can be adjusted to conditions, and so CDA works to run each cylinder at a higher load, which increases that cylinder's brake thermal efficiency, which improves fuel economy. CDA permits fuel economy benefits by deactivating one or more cylinders to conserve fuel to that cylinder and to conserve energy expenditures to actuate that cylinder. Fuel economy is increased in the remaining active cylinders, because the fuel to those cylinders is adjusted in response to the deactivated cylinder and in response to the load or idle conditions. The amount of fuel can be metered for the circumstances.

Pollution is reduced in one aspect by deactivating cylinders in CDA mode. Turning off one or more cylinders causes reduction in inefficient fuel use, which lowers pollution and fuel consumption. So, CDA causes instantaneous benefits. Because the AFR is adjusted to the active cylinders, the amount of air necessary for optimal combustion is also tailored to the active cylinder. In a low load condition, the amount of torque output needed is quite small. Pushing air in to all cylinders, and pushing fuel in to all cylinders puts out too much torque and uses too much energy and fuel. Deactivating one or more cylinders permits one or more remaining firing cylinders to use more fuel or less air, resulting in a hotter combustion. The higher heat combustion has lower tailpipe pollution because the catalyst bed can be heated and pollution can be better filtered. In one aspect, the NOx emissions reduce because less quantity of exhaust output generates less NOx. However, higher fuel economy increases NOx, because efficient combustion increases NOx. Thus, there are tradeoffs between increased fuel efficiency, decreased exhaust amount, and the ability of the catalyst to heat to optimum NOx filtering temperature.

Just using CDA, absent adjustments to AFR or fuel to other cylinders, increases the fuel efficiency by 5%, because there is less fuel use with cylinders deactivated. Friction losses to the CDA piston are far outweighed by gains from not running the valves and injector(s).

But, adjusting AFR to the active cylinders can increase pollution by increasing the efficiency of combustion. Efficient fuel use in a cylinder can increase NOx. So with CDA, the amount of air necessary for optimal combustion is also tailored to the active cylinder. In a low load condition, the amount of torque output needed is quite small. Pushing air in to all cylinders, and pushing fuel in to all cylinders puts out too much torque and uses too much energy and fuel. Deactivating one or more cylinders permits one or more remaining cylinders to use more fuel or less air, resulting in a hotter combustion. The higher heat combustion has lower pollution because the catalyst bed can be heated and pollution can be better filtered by the aftertreatment system, which runs most efficiently when heated to between 200-300 Degrees Centigrade.

Adjusting the AFR with CDA instantly heats the exhaust. The higher heat exhaust warms the catalyst to its optimum filtering temperature. Using CDA, it is possible to remove the fuel doser that would otherwise be needed to raise exhaust temperature during low load or low temperature operation. This reduces aftertreatment fuel use and expenses. For urea pollution management systems, the need for urea is dramatically reduced.

On the one hand, NOx emissions reduce during CDA in low load conditions because there is a decrease in the amount of exhaust gas output. Fewer cylinders in use spew less exhaust. Less exhaust output generates less NOx. However, decreasing the exhaust via CDA reduces flow rate by half, which reduces the amount of exhaust for heating the catalyst. But, the reduced flow rate retains heat in the catalyst better, and the exhaust is hotter, which heats the catalyst quicker. However, higher fuel economy increases NOx, because efficient combustion increases NOx. With better catalyst heating, the catalyst is better able to absorb the NOx. Thus, there are tradeoffs between increased fuel efficiency, decreased exhaust amount, and the ability of the catalyst to heat to optimum NOx filtering temperature.

The exhaust heats instantly, because CDA can be turned on and off in one cam revolution, but the surrounding metal, such as cylinder-to-cylinder heat transfer and such as the catalyst itself, take longer to warm up from heat transfer. Meeting future emissions standards becomes an issue of heating the operating environment around the ideally heated exhaust.

Running the engine efficiently using CDA uses fuel more efficiently in the active firing cylinders, while using no fuel in the inactive cylinders. The reduced fuel use increases fuel economy, which is highly desired. The increased catalyst function versus low fuel use is also highly desired. Using less fuel more efficiently ultimately reduces NOx emissions for the engine.

Cylinder Deactivation Use Strategy (Exhaust Temperature On-Demand)

Cylinder deactivation is extremely beneficial to fuel economy and aftertreatment pollution management and can be implemented when the full engine torque output is not required. CDA can be used to heat exhaust temperature, which heats the catalyst, which causes better NOx management. A heated catalyst is better able to filter NOx.

CDA deactivates the intake valve, exhaust valve, and fuel injection to a cylinder, while increasing the torque output of the remaining cylinders, as by running the other cylinders in a more fueled condition, or in a more stoichiometric air-fuel ratio. Unlike a gasoline engine, a diesel engine can have variations in the air-fuel ratio (AFR) such that the amount of air can be varied with respect to the amount of fuel to adjust the torque output. Adjusting the AFR to adjust the torque output also adjusts the heat output of the cylinder.

One control technique implements CDA mode only when the exhaust temperature is below 250 degrees Centigrade. Below this temperature, NOx is poorly filtered. Above this temperature, the catalyst is efficient. Fuel economy ordinarily closely tracks this phenomenon. But, CDA increases fuel economy by more efficiently using fuel in each cylinder, as by adjusting the air-fuel ratio (AFR).

In diesel, a fuel efficient cylinder increases both NOx output and exhaust temperature. So, it is thought that CDA is bad: it increases NOx. But, the temperature increase improves the ability of the catalyst to filter pollution. This ultimately filters more NOx than the fuel economy increase adds, resulting in a net reduction in pollution.

Note that the 250 degree line for implementing CDA can be adjusted to 200 or 300 degrees Centigrade, depending upon catalyst material and goal NOx output.

A large portion of a diesel engine's operation map outputs torque with the exhaust temperature below 250 Centigrade as shown in FIG. 7. So in low load or idle conditions, the engine speed can reach 2400 RPMs without outputting enough heat to efficiently use the aftertreatment system. CDA can thus be implemented across a large range of engine RPMs to raise exhaust temperature for efficient NOx filtering. Contrary to prior thought, CDA does not have to be limited to low engine speed operation. CDA can be implemented based on exhaust temperature. Since full engine load capacity is not needed in the critical temperature band, cylinders can be deactivated to meet aftertreatment temperature goals without impacting the operation speed of the engine. Thus, the control strategy of implementing CDA only when the exhaust temperature is below a certain temperature limit removes the reliance on engine load for determining CDA mode. The temperature limit controls the amount of time CDA is active without impacting other load operation modes.

Studying the engine map reveals that the need for CDA mode decreases as engine RPMs increase. The engine is more able to output exhaust at target aftertreatment temperatures as load and speed increase. Restricting CDA by temperature makes CDA use less detectable to the driver, who has ordinary operation experience above the low-load temperature band.

Cylinder Deactivation for Catalyst Regeneration

It is difficult to design the catalyst for optimal operation for the full temperature range of 0-600 degrees Centigrade. At some point, the low temperature NOx filtering materials cannot withstand the heat of DPF catalyst regeneration, yet higher temperature filtering materials perform poorly at low temperatures. So, capturing NOx is difficult.

Using CDA, it is possible to remove the fuel doser that would otherwise be needed to raise exhaust temperature during low load or low temperature operation. This reduces aftertreatment fuel use and expenses. For urea pollution management systems, the need for urea is dramatically reduced.

One issue is that a fuel-efficient diesel has increased NOx output. For example, a fuel efficient combustion diesel can output 6-9 grams NOx/engine hour. However, regulations require output of 0.2, and soon to be 0.02 grams NOx/engine hour. Only by having an efficient aftertreatment system can the goal be reached while satisfying consumer demand for fuel efficiency. And so it becomes necessary to heat the catalyst quickly for efficient filtering and for efficient burn-off.

The exhaust heats instantly, for example, an additional 100-110 degrees Centigrade can be added to the exhaust temperature by switching from normal operation to CDA operation. This contrasts sharply with EEVO and other prior art strategies that must cycle for some time to bring exhaust temperature up. Current heavy machinery can take all 20 minutes of its FTP (Federal Testing Procedure) emissions test to come up to the correct temperature for emissions standards, if at all. Certain machinery never generates enough heat to pass emissions tests. Other strategies require 7 minutes to warm up to reach emissions test. CDA mode can heat an aftertreatment system within 3 minutes. The increased exhaust temperature available through CDA mode is greater than competing strategies, and requires less fuel to reach that temperature than competing strategies.

Because CDA can be turned on and off in one cam revolution, the ability to switch cylinders between normal and CDA modes permits fast tailoring of the exhaust temperature. Meeting future emissions standards becomes an issue of ideally heated and filtered exhaust.

Catalyst regeneration heats the catalyst to a particular temperature, for example 500-600 degrees Centigrade. NOx is burnt off, along with other pollutants, to clean the catalyst so that it can filter pollution once again. Because CDA can so instantly heat the exhaust, it is an asset for particulate filter regeneration techniques. Using CDA can reduce vehicle down time for regeneration, and provide more on-demand regeneration. So, instead of pulling road-side to run the engine at high RPMs with the parking brake on, CDA mode can activate during vehicle operation to regenerate the catalyst.

Using CDA, it is possible to remove the fuel doser that would otherwise be needed to clean the catalyst during low load or low temperature operation. This furthers the goal of redesign of the aftertreatment for one temperature band for efficient operation. Ideally, the catalyst operates from 200-600 degrees Centigrade, but from a materials science perspective, it is difficult to design the catalyst for the whole temperature operating range 0-600 C. Thus, using CDA to instantly heat the exhaust to 200 or more degrees Centigrade alleviates some of the material burden of including a low temperature filtering material in the catalyst. The optimal temperature band of the aftertreatment can be moved, and the materials within adjusted accordingly.

Other implementations will be apparent to those skilled in the art from consideration of the specification and practice of the examples disclosed herein. It is intended that the specification and examples be considered as exemplary only, with a true scope of the invention being indicated by the following claims.

What is claimed is:

1. A pollution management system for a diesel engine, comprising:
    a diesel engine comprising a plurality of combustion cylinders, each of the plurality of combustion cylinders comprising a respective:
        piston connected to a crankshaft;
        fuel injector connected to an injection controller;
        intake valve connected to an intake valve controller; and
        exhaust valve connected to an exhaust valve controller;
    a load monitoring sensor;
    a controllable intake assisting device connected to the diesel engine and configured to selectively boost air supplied to the diesel engine;
    an exhaust system connected to the exhaust valves, the exhaust system comprising:
        a catalyst for filtering pollution from an exhaust stream; and
        a sensor for measuring a pollution level in the exhaust stream; and
    a control unit comprising a processor, a memory device, and processor-executable control algorithms stored in the memory, the control algorithms configured to iteratively:
        receive load data;
        determine a load on the engine;
        determine an engine output requirement based on the load on the engine;
        select between increasing and decreasing an air to fuel ratio;
        receive pollution level sensor data from the sensor;
        determine a pollution level in the exhaust stream;
        determine whether the pollution level exceeds a pollution threshold for pollution exiting the exhaust system;
        when the pollution level in the exhaust stream exceeds the pollution threshold:
            select at least one of the plurality of combustion cylinders for deactivation, wherein the plurality of combustion cylinders selected for deactivation are configured to change in number or location among iterations;
            command the injection controller to deactivate the respective fuel injector for the at least one of the selected combustion cylinders;
            command the intake valve controller to deactivate the respective intake valve for the at least one of the selected combustion cylinders;
            command the exhaust valve controller to deactivate the respective exhaust valve controller for the at least one of the selected combustion cylinders;
            command variations in the air to fuel ratio for each of the active plurality of combustion cylinders among iterations so that the air to fuel ratio is selectively increased or decreased among respective iterations to control the pollution level exhausted from the engine so that the pollution level exiting the exhaust system is below the pollution threshold while the at least one of the plurality of combustion cylinders is selected for deactivation; and
        when a load on the engine is below a first threshold, adjust the number of the plurality of combustion cylinders selected for deactivation to meet engine output requirements.

2. The pollution management system of claim 1, wherein the sensor monitors a mono-nitrogen oxide level in the exhaust stream.

3. The pollution management system of claim 1, wherein the control algorithm is further configured to command the injection controller to increase fuel to active combustion cylinders of the plurality of combustion cylinders when the pollution level in the exhaust stream exceeds a pollution threshold.

4. The pollution management system of claim 1, wherein, when a load on the engine is above the first threshold, the control algorithm is further configured to:
    deselect the at least one of the plurality of combustion cylinders selected for deactivation;
    command the injection controller to activate the respective fuel injector for the at least one of the deselected combustion cylinders;
    command the intake valve controller to activate the respective intake valve for the at least one of the deselected combustion cylinders, and
    command the exhaust valve controller to activate the respective exhaust valve controller for the at least one of the deselected combustion cylinders.

5. The pollution management system of claim 1, wherein the control algorithm is further configured to adjust commands to the fuel injector to adjust the quantity of fuel injected to active combustion cylinders of the plurality of combustion cylinders based on the engine output requirement.

6. The pollution management system of claim 5, further comprising an air flow sensor, wherein the control algorithm is further configured to:
    receive air flow data;
    determine an air flow amount to the respective intake valves;
    determine an air fuel ratio for each of the plurality of combustion cylinders based on the determined air flow amount and based on the fuel injector commands; and
    based on the determined air fuel ratio, command the intake assisting device to boost air flow to the plurality of combustion cylinders when the load on the engine is within a predetermined range.

7. The pollution management system of claim 1, further comprising an air flow sensor, wherein the control algorithm is further configured to:
    receive air flow data;
    determine an air flow amount to the respective intake valves;
    determine an air fuel ratio for each of the plurality of combustion cylinders based on the determined air flow amount and based on the fuel injector commands; and based on the determined air fuel ratio, adjust commands to the fuel injector to adjust the quantity of fuel injected to active combustion cylinders of the plurality of combustion cylinders.

8. The pollution management system of claim 7, wherein the control algorithm is further configured to process pollution level data to iteratively adjust the commands to the fuel injector to change the quantity of fuel injected among iterations until the pollution level is below the pollution threshold.

9. The pollution management system of claim 1, wherein the control algorithm is further configured to process pollution level data to iteratively adjust the commands to the fuel injector to change the quantity of fuel injected among iterations until the pollution level is below the pollution threshold.

10. The pollution management system of claim 1, further comprising an exhaust temperature sensor, wherein the control algorithm is further configured to:
receive and process exhaust temperature data from the exhaust temperature sensor; and
based on the exhaust temperature data, iteratively adjust commands to the fuel injector to adjust the quantity of fuel injected to active combustion cylinders of the plurality of combustion cylinders among the iterations and adjust the number of the plurality of combustion cylinders selected for deactivation.

11. The pollution management system of claim 1, wherein the control algorithm is further configured to command the intake valve controller to delay intake valve closing to active combustion cylinders of the plurality of combustion cylinders.

12. The pollution management system of claim 1, wherein the control algorithm is further configured to command the intake valve controller to perform early intake valve closing on active combustion cylinders of the plurality of combustion cylinders.

13. The pollution management system of claim 1, wherein the control algorithm is further configured to command the intake valve controller to perform late intake valve opening on active combustion cylinders of the plurality of combustion cylinders.

14. The pollution management system of claim 1, wherein the control algorithm is further configured to command the exhaust valve controller to perform early exhaust valve closing on active combustion cylinders of the plurality of combustion cylinders.

15. The pollution management system of claim 1, wherein the control algorithm is further configured to command the exhaust valve controller to perform early exhaust valve opening on active combustion cylinders of the plurality of combustion cylinders.

16. The pollution management system of claim 1, wherein the control algorithm is further configured to command the exhaust valve controller and the intake valve controller to perform negative valve overlap on active combustion cylinders of the plurality of combustion cylinders.

17. A method for operating a multiple cylinder diesel engine system in a cylinder deactivation mode, comprising:
determining that the diesel engine system is operating within at least one threshold range;
determining a pollution level in an exhaust stream by processing received sensed pollution level data from a pollution sensor;
entering cylinder deactivation mode in at least one cylinder of a multiple-cylinder diesel engine when the diesel engine system is operating within the at least one threshold range and when the determined pollution level exceeds a pollution threshold; and
selecting between increasing and decreasing an air fuel ratio to at least one firing cylinder of the multiple-cylinder diesel engine by selectively boosting the air supplied prior to combustion or by selectively decreasing the air to fuel ratio supplied prior to combustion based on the entering of cylinder deactivation mode in the at least one cylinder,
wherein entering cylinder deactivation mode comprises:
deactivating fuel injection to the at least one cylinder; and
deactivating intake valve actuation and exhaust valve actuation to the at least one cylinder, and
wherein determining that the diesel engine system is operating within at least one threshold range comprises monitoring an engine operating mode, wherein the threshold range comprises one or more of an idle engine operating mode, a loaded idle engine operating mode, and a loaded engine operating mode, and wherein the number of cylinders of the multiple-cylinder diesel engine entering cylinder deactivation mode is adjusted based on whether the engine operating mode is the idle engine operating mode, the loaded idle engine operating mode, or the loaded engine operating mode, and further wherein the number of cylinders of the multiple-cylinder diesel engine entering cylinder deactivation mode is further adjusted to reduce the sensed pollution level exiting in the exhaust stream to be below the pollution threshold.

18. The method of claim 17, wherein the determination comprises monitoring an exhaust temperature, and wherein the threshold range comprises an exhaust temperature range.

19. The method of claim 18, wherein the exhaust temperature range is below an ideal catalyst bed temperature.

20. The method of claim 19, wherein the ideal catalyst bed temperature is between 200-300 degrees Centigrade.

21. The method of claim 19, wherein the ideal catalyst bed temperature is above 200 degrees Centigrade.

22. The method of claim 19, wherein the ideal catalyst bed temperature is above 300 degrees Centigrade.

23. The method of claim 18, wherein the threshold range is an exhaust temperature beneath a diesel particulate filter regeneration temperature.

24. The method of claim 23, wherein the diesel particulate filter regeneration temperature is above 500 degrees Centigrade.

25. The method of claim 17, further comprising exiting cylinder deactivation mode when the diesel engine is operating outside the at least one threshold range.

26. The method of claim 17, wherein a loaded engine operating mode comprises a lightly loaded mode, a medium load mode, and a heavy duty load mode, and wherein the threshold range comprises the lightly loaded mode and the medium load mode.

27. The method of claim 17, further comprising augmenting torque output from the diesel engine by coupling compression spring-back from a piston in the deactivated at least one cylinder to a crankshaft of the diesel engine.

28. The method of claim 17, wherein adjusting the air fuel ratio to at least one firing cylinder comprises reducing the air fuel ratio by injecting more fuel in to the at least one firing cylinder.

29. The method of claim 17, wherein adjusting the air fuel ratio to at least one firing cylinder comprises reducing the air fuel ratio by providing exhaust gas recirculation to the at least one firing cylinder.

30. The method of claim 17, wherein adjusting the air fuel ratio to at least one firing cylinder comprises increasing the air fuel ratio by reducing fuel injected in to the at least one firing cylinder.

31. The method of claim 17, wherein adjusting the air fuel ratio to at least one firing cylinder comprises increasing the air fuel ratio by directing intake gases from an intake assisting device to the at least one firing cylinder.

32. The method of claim 31, wherein the intake assisting device is a supercharger.

33. The method of claim 31, wherein the intake assisting device augments intake flow provided by a turbocharger.

34. The method of claim 31, wherein the method does not comprise actuating a turbocharger.

35. The method of claim 17, wherein adjusting the air fuel ratio to at least one firing cylinder comprises adjusting one or both of the intake gases and the fuel injection to the at least one firing cylinder to maintain an air fuel ratio of seventeen parts air to one part fuel or greater.

36. The method of claim 35, wherein the air fuel ratio is between seventeen parts air to one part fuel and seventy parts air to one part fuel.

37. The method of claim 35, wherein the air fuel ratio is between twenty parts air to one part fuel and fifty parts air to one part fuel.

38. The method of claim 35, wherein the air fuel ratio is between twenty-two parts air to one part fuel and twenty-four parts air to one part fuel.

39. The method of claim 35, wherein the air fuel ratio is between twenty-four parts air to one part fuel and forty-five parts air to one part fuel.

40. The method of claim 35, wherein the air fuel ratio is between thirty parts air to one part fuel and forty-five parts air to one part fuel.

41. The method of claim 17, further comprising monitoring an exhaust temperature, and wherein adjusting the air fuel ratio to the at least one firing cylinder is based on raising the exhaust temperature.

42. The method of claim 17, further comprising monitoring an exhaust temperature, and wherein adjusting the air fuel ratio to the at least one firing cylinder is based on maintaining the exhaust temperature above a threshold temperature.

43. The method of claim 17, further comprising monitoring a brake thermal efficiency, and wherein adjusting the air fuel ratio to the at least one firing cylinder is based on maintaining the brake thermal efficiency above a brake thermal efficiency threshold.

44. The method of claim 17, wherein adjusting the air fuel ratio to the at least one firing cylinder is based on reaching a target pollution level that is below the pollution threshold.

45. The method of claim 17, further comprising adjusting the fuel injection timing to the at least one firing cylinder.

46. The method of claim 17, further comprising one or both of adjusting intake valve actuation timing and adjusting exhaust valve actuation timing to the at least one firing cylinder.

47. The method of claim 17, wherein adjusting the air fuel ratio comprises maintaining an exhaust temperature above a threshold such that the relationship between the air fuel ratio and the exhaust temperature follows a polynomial curve.

48. The method of claim 17, further comprising exiting cylinder deactivation mode when the diesel engine system is operating outside the threshold range and entering an early intake valve closing mode.

49. The method of claim 17, further comprising exiting cylinder deactivation mode when the diesel engine system is operating outside the threshold range and entering a late intake valve closing mode.

50. The method of claim 17, further comprising entering an early intake valve closing mode on the at least one firing cylinder.

51. The method of claim 17, further comprising entering a late intake valve closing mode on the at least one firing cylinder.

52. The method of claim 17, further comprising entering a negative valve overlap mode on the at least one firing cylinder.

53. The method of claim 17, further comprising entering an early exhaust valve opening mode on the at least one firing cylinder.

54. The method of claim 17, further comprising adjusting an intake manifold pressure.

55. The method of claim 17, further comprising receiving a power demand input and adjusting the air fuel ratio to meet the power demand input.

56. The method of claim 17, further comprising monitoring a torque output of the diesel engine prior to entering cylinder deactivation mode, and adjusting the air fuel ratio to result in an equal torque output when the engine system enters cylinder deactivation mode.

57. A method for operating a multiple cylinder diesel engine system in a cylinder deactivation mode, comprising:
   determining that the diesel engine system is operating within at least one threshold range;
   entering cylinder deactivation mode in at least one cylinder of a multiple-cylinder diesel engine when the diesel engine system is operating within the at least one threshold range;
   augmenting torque output from the diesel engine by coupling compression spring-back from a piston in the deactivated at least one cylinder to a crankshaft of the diesel engine;
   adjusting an air fuel ratio to at least one firing cylinder of the multiple-cylinder diesel engine by boosting the air supplied prior to combustion based on the entering of cylinder deactivation mode in the at least one cylinder,
   wherein entering cylinder deactivation mode comprises:
      deactivating fuel injection to the at least one cylinder; and
      deactivating intake valve actuation and exhaust valve actuation to the at least one cylinder.

58. The method of claim 57, wherein the determination comprises monitoring an engine crankshaft speed, wherein the threshold range is broken in to a high speed threshold range and a low speed threshold range, and wherein the number of cylinders of the multiple-cylinder diesel engine entering cylinder deactivation mode is adjusted to differ based on whether the engine crankshaft speed is within the high speed threshold range or the low speed threshold range.

59. A method for operating a multiple cylinder diesel engine system in a cylinder deactivation mode, comprising:
   determining that the diesel engine system is operating within at least one threshold range comprising a start-up mode;
   determining a pollution level in an exhaust stream by processing received sensed pollution level data from a pollution sensor;
   entering cylinder deactivation mode in at least one cylinder of a multiple-cylinder diesel engine when the diesel engine system is operating within the at least one threshold range and when the determined pollution level exceeds a pollution threshold; and selecting between increasing and decreasing an air fuel ratio to at least one firing cylinder of the multiple-cylinder diesel engine by selectively boosting the air supplied prior to combustion or by selectively decreasing the air to fuel ratio supplied prior to combustion so that the sensed pollution level data adjusts such that the determined pollution level exiting in the exhaust stream is below the pollution threshold during cylinder deactivation mode in the at least one cylinder, wherein entering cylinder deactivation mode comprises:
deactivating fuel injection to the at least one cylinder; and
deactivating intake valve actuation and exhaust valve actuation to the at least one cylinder.

60. A method for operating a multiple cylinder diesel engine system in a cylinder deactivation mode, comprising:

monitoring a user input and determining that the diesel engine system is operating within at least one threshold range comprising the user input;

determining a pollution level in an exhaust stream by processing received sensed pollution level data from a pollution sensor;

entering cylinder deactivation mode in at least one cylinder of a multiple-cylinder diesel engine when the diesel engine system is operating within the at least one threshold range and when the determined pollution level exceeds a pollution threshold; and selecting between increasing and decreasing an air fuel ratio to at least one firing cylinder of the multiple-cylinder diesel engine by selectively boosting the air supplied prior to combustion or by selectively decreasing the air to fuel ratio supplied prior to combustion so that the sensed pollution level data adjusts such that the determined pollution level exiting in the exhaust stream is below the pollution threshold during cylinder deactivation mode in the at least one cylinder, wherein entering cylinder deactivation mode comprises:
deactivating fuel injection to the at least one cylinder; and
deactivating intake valve actuation and exhaust valve actuation to the at least one cylinder.

61. The method of claim 60, wherein the determination comprising monitoring a user input comprises monitoring an accelerator position, and wherein the threshold range comprises a subset of accelerator positions as the user input.

62. A method for operating a multiple cylinder diesel engine system in a cylinder deactivation mode, comprising:

determining that the multiple-cylinder diesel engine system is operating within at least one threshold range;

sensing and monitoring an exhaust flow rate through an aftertreatment system;

entering cylinder deactivation mode in at least one cylinder of the multiple-cylinder diesel engine system when the multiple-cylinder diesel engine system is operating within the at least one threshold range;

adjusting the number of at least one cylinder entering cylinder deactivation mode to reach a target exhaust flow rate and thereby control heat transfer in a catalyst of the aftertreatment system; and selecting between increasing and decreasing an air fuel ratio to at least one firing cylinder of the multiple-cylinder diesel engine system by selectively boosting the air supplied prior to combustion or by selectively decreasing the air to fuel ratio supplied prior to combustion based on the entering of cylinder deactivation mode in the at least one cylinder, wherein entering cylinder deactivation mode comprises:
deactivating fuel injection to the at least one cylinder; and
deactivating intake valve actuation and exhaust valve actuation to the at least one cylinder.

* * * * *